(12) United States Patent
Gonzales et al.

(10) Patent No.: US 6,865,428 B2
(45) Date of Patent: Mar. 8, 2005

(54) METHOD AND APPARATUS FOR PROVIDING DISTRIBUTED CONTROL OF A HOME AUTOMATION SYSTEM

(75) Inventors: Greg Gonzales, Las Cruces, NM (US); Arlee C. Swensen, West Richland, WA (US); Brian D. Baker, Tucson, AZ (US)

(73) Assignee: Microsoft Corporation, Redmond, WA (US)

( * ) Notice: Subject to any disclaimer, the term of this patent is extended or adjusted under 35 U.S.C. 154(b) by 24 days.

(21) Appl. No.: 10/154,448

(22) Filed: May 22, 2002

(65) Prior Publication Data

US 2003/0040813 A1 Feb. 27, 2003

Related U.S. Application Data

(63) Continuation of application No. 09/955,570, filed on Sep. 17, 2001, now abandoned, which is a continuation of application No. 09/751,383, filed on Dec. 29, 2000, now abandoned.
(60) Provisional application No. 60/173,741, filed on Dec. 30, 1999.

(51) Int. Cl.$^7$ .............................................. G05B 19/42
(52) U.S. Cl. ............................... 700/86; 700/9; 700/11; 700/17; 700/19; 700/76; 700/83; 700/87; 700/276; 700/264; 315/294; 315/295; 315/297; 315/291; 315/307; 315/312; 315/324; 345/866
(58) Field of Search ............................. 700/83, 86, 87, 700/76, 9, 11, 19, 17, 276, 264, 12, 47, 20, 18, 23; 315/294, 295, 297, 291, 307, 312, 324; 345/866

(56) References Cited

U.S. PATENT DOCUMENTS 5,187,655 A * 2/1993 Post et al. ................... 700/17
5,560,322 A * 10/1996 Fitzgerald ..................... 122/64
5,621,662 A * 4/1997 Humphries et al. ......... 700/276
5,677,603 A * 10/1997 Speirs et al. ................. 315/324
5,706,191 A * 1/1998 Bassett et al. ................. 700/9
5,841,360 A 11/1998 Binder
5,877,957 A * 3/1999 Bennett ....................... 700/86
6,466,234 B1 * 10/2002 Pyle et al. ................... 345/771
6,545,434 B2 * 4/2003 Sembhi et al. .............. 315/312

OTHER PUBLICATIONS

CEBus Industry Council (CIC), *HomePnP™ Specification Version 1.0, Home Plug & Play™: CAL–Based Interoperability for Home Systems*, Indianapolis, Ind., Apr. 9, 1998, pp. 1–111.

(List continued on next page.)

*Primary Examiner*—Anthony Knight
*Assistant Examiner*—Thomas Pham
(74) *Attorney, Agent, or Firm*—Christensen O'Connor Johnson Kindness PLLC

(57) ABSTRACT

A method and apparatus for providing distributed control of a home automation system is provided. Each device participating in a home automation system is equipped with control logic for providing distributed control. Through the control logic, each device maintains scene definitions describing the state of the device for each scene in which it participates. When any device in the system receives a request to launch a scene, such as a button press on one of the devices, the device broadcasts a scene state change message to all devices within the home automation system. The scene state change message identifies to each device a particular scene that should be launched. Each device in the system receives the message and determines whether the device is a participant in the scene. If the device is a participant in the scene, the device adjusts its state according to a scene definition stored in the device associated with the scene. The device may adjust a controlled electrical load, such as a light, according to the scene definition by turning the load on, off, or setting the load to some intermediate value.

28 Claims, 17 Drawing Sheets

OTHER PUBLICATIONS

Evans, Grayson, "CEBus: Defining the Future of Residential Communications," *Australian Electronics Engineering* 30(3):34–36, 38, Mar. 1997.

Lawrenz, Wolfhard, "eBUS—Der Bus für die Heizungstechnik," *Elektronik* 47(2):60, 62, 64–66, Jan. 20, 1998.

Markwater, Brian, and Larry Stickler, "Design Techniques for Plug-and-Play in 'Smart Homes' and Consumer Products," *Electronic Design* 45(17):64–66, 68, Aug. 18, 1997.

Tsang, Peter W. M., and Raymond W. C. Wang, "Development of a Distributive Lighting Control System Using Local Operating Network," *IEEE Transactions on Consumer Electronics* 40(4):879–889, Nov. 1, 1994.

Wright, Maury, "Home-Automation Networks Mature While the PC Industry Chases a New Home LAN," *EDN*, Jun. 4, 1998, pp. 101–102, 104, 106, 108, 110, 112–114.

* cited by examiner

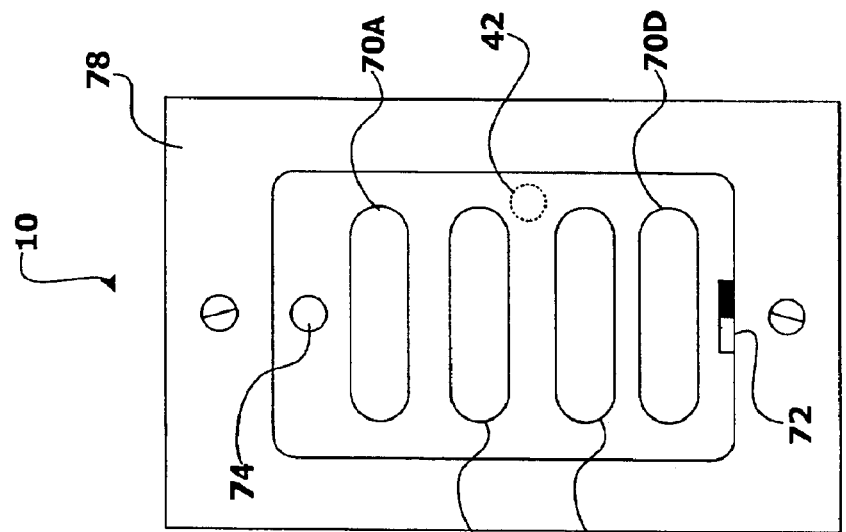
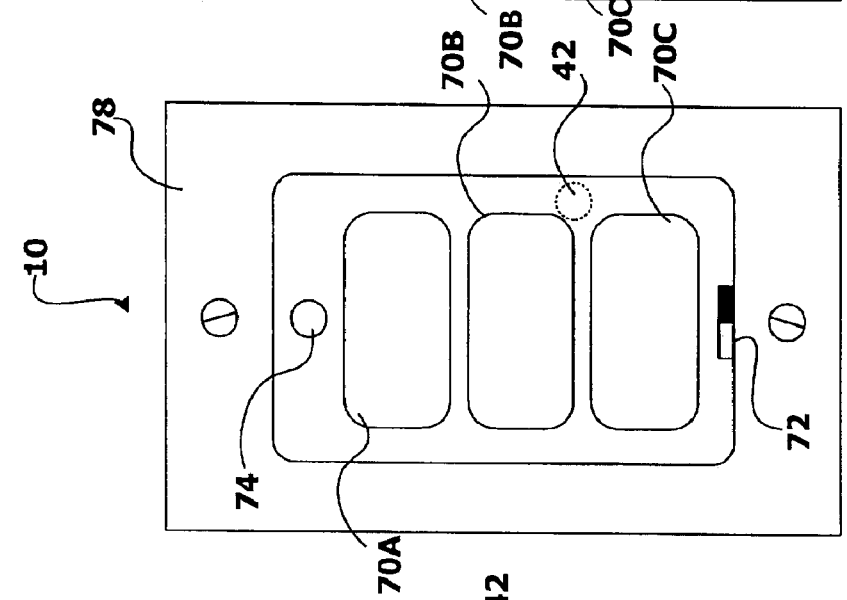
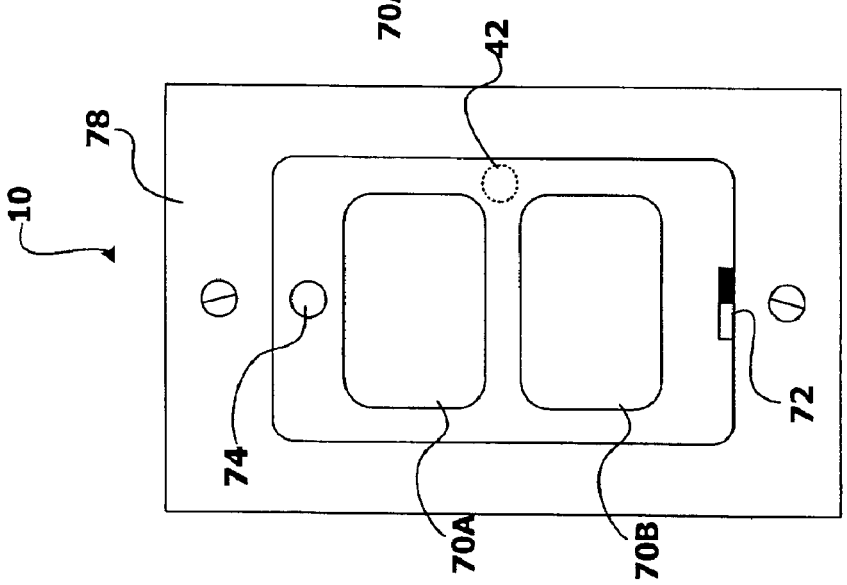

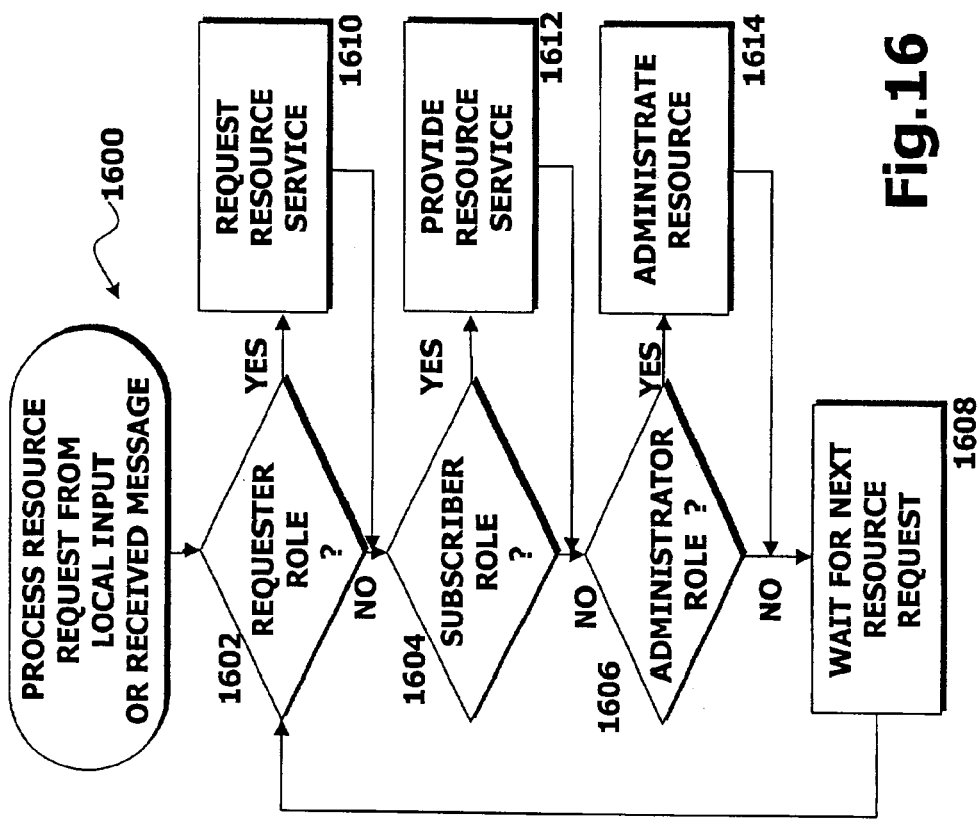

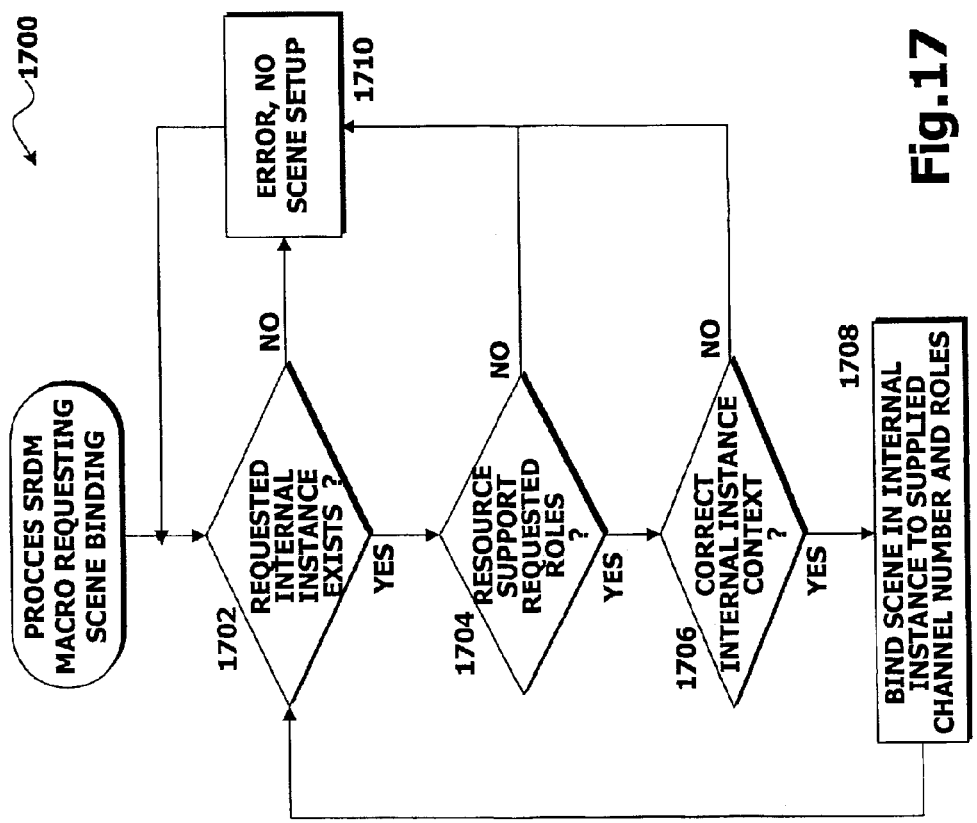

METHOD AND APPARATUS FOR PROVIDING DISTRIBUTED CONTROL OF A HOME AUTOMATION SYSTEM

CROSS-REFERENCE TO RELATED APPLICATIONS

This application is a continuation of U.S. patent application Ser. No. 09/955,570, filed Sep. 17, 2001 now abandoned, is a continuation of U.S. patent application No. 09/751,383, filed Dec. 29, 2000, now abandoned, which claims the benefit of Provisional Application No. 60/173,741, filed Dec. 30, 1999, each of which applications is expressly incorporated herein by reference.

FIELD OF THE INVENTION

The present invention relates to the field of home automation systems and, more particularly, to a method and apparatus for providing distributed control of a home automation system and simple connectivity of networked products.

BACKGROUND OF THE INVENTION

Home automation systems are used to control the behavior of an environment such as a home or office building. Currently, home automation systems require a central controller to create and launch "scenes," also called house scenes, involving multiple controlled devices. A scene is a collection of devices, such as lighting, heating and air conditioning, landscape sprinklers, window treatments, audio/visual equipment, water heaters, humidifiers, etc., set in a specific state. For example, through the use of a central controller, a user could create a scene where certain lights are set at specified levels, where the thermostat is set at a specified level, and where a stereo unit is activated and set to a particular station. This setting of devices constitutes a scene, and may be triggered by a trigger event also defined by the user, such as the press of a button on a remote control.

In automation systems using a central controller, a scene is launched, or triggered, when the central controller detects the trigger event. In response to detecting the trigger event, the central controller sends messages to the devices that are members of the scene directing them to go to their scene state. Because all messages go through the central controller, the central controller creates a single point of failure. If the central controller fails, then scenes can no longer be triggered because the controller can no longer send the necessary messages to the scene member devices to produce the scenes. In effect, if the central controller fails, the entire home automation system is rendered unusable. This single point of failure is highly undesirable to users of such systems.

Additionally, the use of a central controller creates a heavy load of network traffic. Since the central controller must send a message to each scene member device individually, the message traffic on the communication network for a scene with many member devices grows proportionally with the number of devices. For a scene with a large number of devices, this also causes a time delay time between the start of the scene when the first device gets its message until the last device gets its message. Such heavy network traffic and delay in triggering scene member devices is also undesirable to users of home automation systems.

Therefore, in light of the above, there is a need for a home automation system that provides distributed control of the system, thereby eliminating the single point of failure found in previous home automation systems. There is also a need for a home automation system that utilizes minimal scene production message traffic, thereby reducing the delay found in previous systems between the time a trigger event is received and when the last scene member is activated.

SUMMARY OF THE INVENTION

The present invention provides a method and system for providing distributed control of a home automation system. According to an embodiment of the present invention, a microcontroller is embedded into each device within a home automation system along with logic for distributing control of the system to all of the participating devices. By embedding control logic within each device, control of the system is distributed, thereby eliminating the single point of failure found in previous home automation systems. According to the present invention, any device in the system may fail and the other devices will continue operating normally.

An aspect of the invention also provides for reduced network traffic for launching a scene as compared to prior art solutions. In particular, according to an embodiment of the present invention, only a single trigger message must be sent to devices participating in the scene in order to launch the scene. No other message traffic is necessary. Moreover, each device maintains its own scene definition for each scene describing the state of the device for the scene. Therefore, the trigger message only needs to identify the scene to the device in order for the scene to be launched. Such a message allows for scene control to be distributed throughout the home automation system, and also reduces the delay found in previous home automation systems between the time a trigger event is received and when the last scene member is activated.

Generally described, the present invention provides a method and apparatus for providing distributed control of a home automation system. According to one embodiment of the present invention, each device participating in a home automation system is equipped with control logic for providing distributed control. Through the control logic, each device maintains scene definitions describing the state of the device for each scene in which it participates.

When any device in the system receives a request to launch a scene, such as a button press on one of the devices, the device broadcasts a scene state change message to all devices within the home automation system. The scene state change message identifies to each device a particular scene that should be launched. Each device in the system receives the message and determines whether the device is a participant in the scene. If the device is a participant in the scene, the device adjusts its state according to a scene definition associated with the scene stored in the device. In particular, the device may adjust a controlled electrical load, such as a light, according to the scene definition by turning the load on, off, or setting the load to some intermediate value. In this manner, a scene may be launched across an entire home automation network.

According to another embodiment of the present invention, a simple programming interface is provided for programming scenes in a distributed control environment. According to this embodiment of the present invention, an indication is received at one of the devices in the home automation system that the devices should be placed into a scene programming mode. In response to the indication, a message is broadcast to each device, thereby placing all devices in the scene programming mode.

Once the devices have been placed in the scene programming mode, devices may be added to the current scene in response to receiving an indication that they should be included, such as an adjustment of a load control switch on the device. Each device included within a particular scene stores within its internal control logic a scene definition corresponding to the scene that describes the current state of the device. In this manner, the current state of the device may be recalled when a scene change message corresponding to the scene is subsequently received. Once all desired devices have been added to the house scene, another indication may be provided assigning scene launch selection, such as to a switch on one of the devices or an icon on a computer. More devices may also be selected for launching the scene by copying the scene launch selection to each additional device. Additionally, a new scene may be created based upon a previously created scene.

According to another embodiment of the present invention, a simple programming interface is provided for programming a multi-way lighting context in a distributed control environment. Through a multi-way lighting context, any device in a multi-way lighting group of devices can directly control all of the devices in that group. According to this embodiment of the present invention, an indication is received at one of the devices in the home automation system that the devices should be placed into a multi-way programming mode. In response to the indication, a message is broadcast to each device, thereby placing all devices in the multi-way programming mode.

Once the devices have been placed in the multi-way programming mode, devices may be added to the multi-way in response to receiving an indication that they should be included, such as the selection of a load control switch on the device. Once all desired devices have been added to the multi-way lighting context, another indication may be provided assigning control of the multi-way to the indicator, such as a switch, on each selected device. Each device in the new multi-way lighting context is then bound to the indicator of every member device in the multi-way and will be directly controlled by any of the multi-way member indicators when the multi-way programming mode is exited. Additionally, new multi-way lighting contexts may be created based upon previously created multi-way lighting contexts.

The present invention also provides a computer-readable medium and system for providing distributed control of a home automation system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A–3C are block diagrams showing illustrative switch devices utilized in an actual embodiment of the present invention.

FIG. 16 is a a flow diagram illustrating a routine for processing resource requests according to an actual embodiment of the present invention.

FIG. 17 is a flow diagram illustrating a routine for processing a macro requesting scene binding according to an actual embodiment of the present invention.

DETAILED DESCRIPTION OF AN ILLUSTRATIVE EMBODIMENT

The present invention is directed to a method and apparatus for providing distributed control of a home automation system. According to an embodiment of the present invention, a device is provided for use in a home automation system that includes control logic for providing distributed control and for providing a simple programming interface to the device. When multiple such devices are utilized throughout a home automation system, control of the system is distributed among the devices. Moreover, a consistent user interface for programming the home automation system is provided across the system. Once a user of the home automation system understands how to program one device, they can similarly program all other devices in the system.

Figure 1:
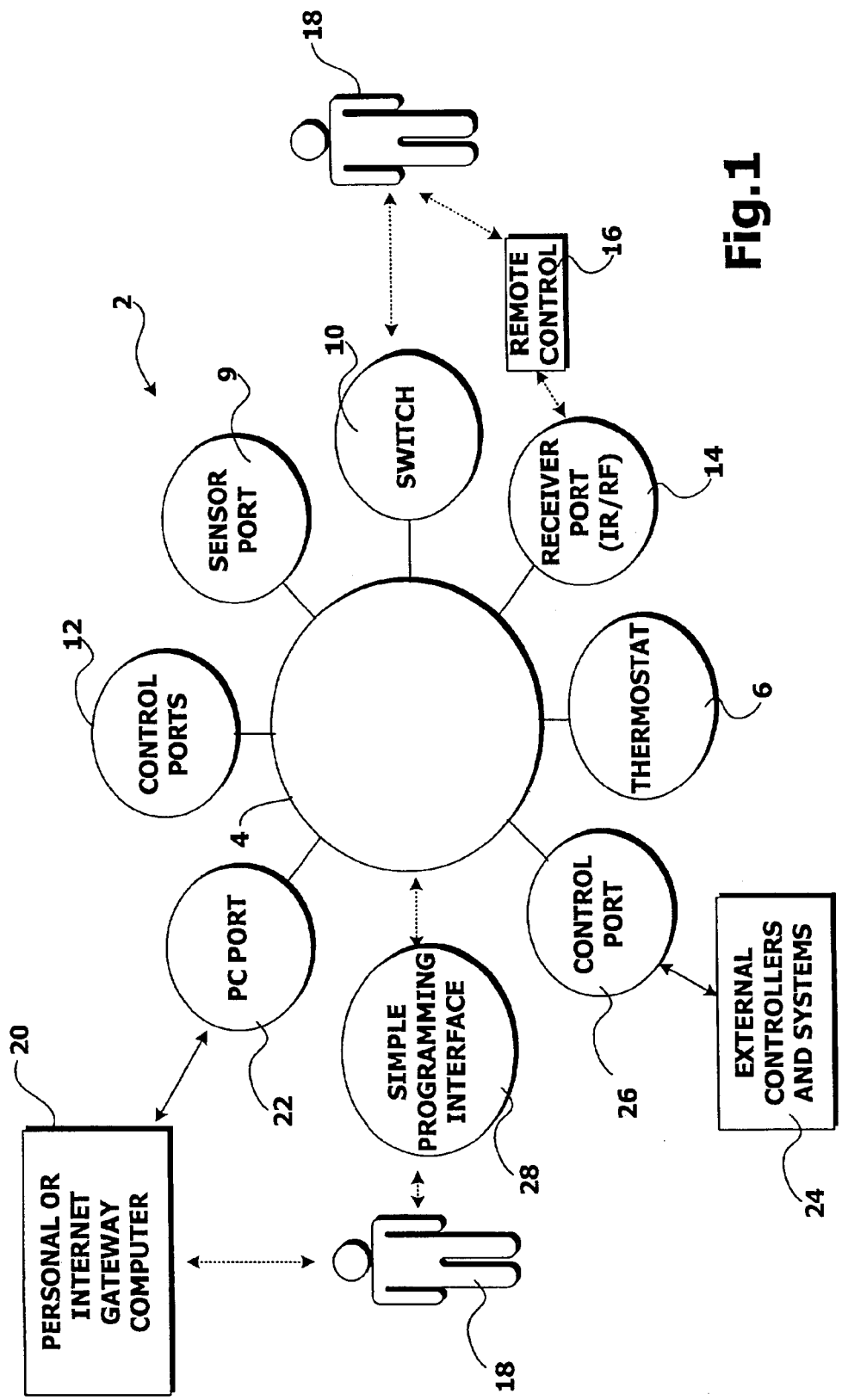
FIG. 1 is a block diagram showing an illustrative home automation system that provides an operating environment for an actual embodiment of the present invention.

Referring now to the figures, in which like numerals represent like elements, an actual embodiment of the present invention will be described. FIG. 1 provides an overview of an illustrative home automation system 2 in which aspects of the present invention may be practiced. It should be appreciated that the use of the term "home automation" includes, but is not limited to, home automation, home networking, or connected home systems, which describe a home where products are not merely connected or integrated with each other locally, but also across the Internet and other networks. Moreover, although the home automation system 2 is described herein as being implemented in a home environment, those skilled in the art should appreciate that such systems may be similarly deployed in a business, factory, or other environment where automation is desired.

The home automation system 2 typically comprises a number of participating devices connected by a common bus 4, or through some other communication means. In the actual embodiment of the present invention described herein, the bus 4 comprises typical household wiring. Those skilled in the art should appreciate, however, that other types of communications media may be utilized including twisted wire pair, coaxial cable, fiber optic cable, or other similar media. Additionally, wireless communications media, such as infrared ("RF") or radio frequency ("RF"), may also be utilized to provide inter-device communication.

The devices connected to the bus 4 and participating in the home automation system 2 may comprise a wide variety of devices for performing a wide variety of functions. For instance, such devices may include a thermostat device 6 for controlling temperature, a sensor port device 8 for detecting motion, light, sound, or other activity, a switch device 10 for triggering scenes or controlling an attached load, and a control port device 12 for controlling an attached load, such as a lamp, appliance or motor. Additionally, such devices may include a receiver port device 14 for triggering scenes based on IR or RF signals received from a wireless remote control 16 operated by a user 18. External controllers and systems 24 may also participate in the home automation system 2 through the use of a "Control Port" device 26 produced by C-SMART LLC of Las Cruces, N. Mex. The Control Port device 26 provides an interface between devices compatible with the home automation system 2, and devices from other manufacturers that are not natively compatible with the home automation system 2. The user 18 may interact with the home automation system 2 through the devices. For instance, the user 18 may utilize the switch device 10 to control a load connected to a control port device 12 or to trigger a scene. The user 18 may also interact with the home automation system 2 through the use of a personal or Internet gateway computer 20. The personal or Internet gateway computer 20 is connected to the bus 4 and may participate in the home automation system 2 through the use of a PC Port device 22. The PC Port device 22 provides bidirectional communication support for the personal computer 20. In this manner, a user 18 can interact with the home automation system 2 through the computer 20, which is equipped with appropriate software, to interrogate devices, create or launch scenes, and perform other functions. User interaction for programming and controlling the home automation system 2 is described in greater detail below.

Aspects of the present invention provide a distributed home automation system that does not rely on a central controller by adding intelligence to each device. As will be described below with respect to FIG. 2, this intelligence takes the form of a microcontroller and other circuitry that provides functionality for distributing control of the home automation system 2 to each of the devices in the system. Moreover, the microcontroller and related circuitry provide a simple programming interface 28 for creating and modifying scenes, and for creating multi-way lighting contexts. State machines for implementing the simple programming interface 28 are described below with reference to FIGS. 5-14. The simple programming interface 28 is shown in FIG. 1 as one entity to illustrate the uniform manual programming, but is actually embedded as part of each system 2 device. Those skilled in the art should appreciate that the simple programming interface 28 is protocol independent and may be implemented using many types of protocols, such as the Simple Control Protocol, the Universal Plug and Play protocol, the IEEE-1394 protocol, and other protocols known to those skilled in the art.

Figure 2:
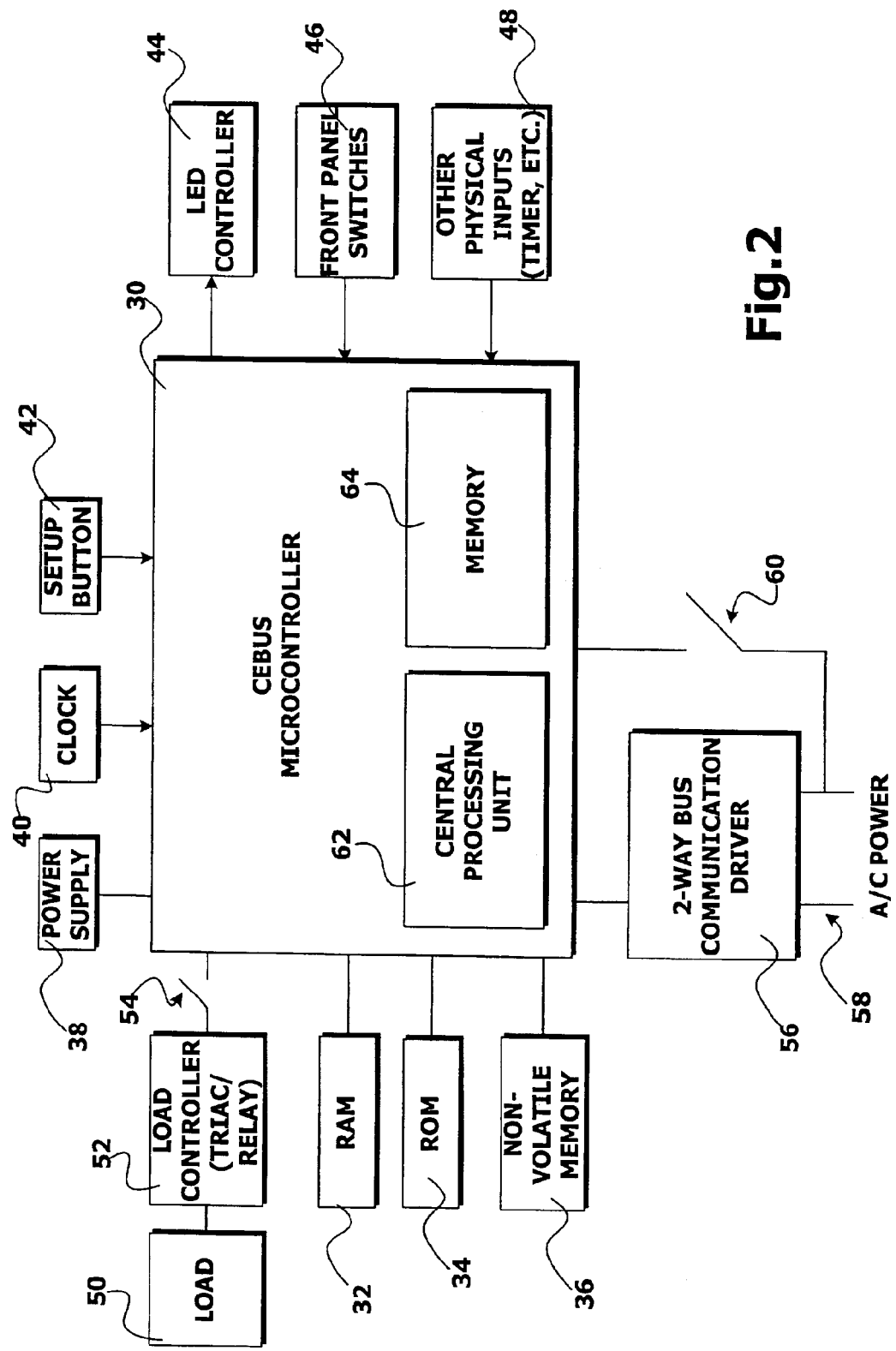
FIG. 2 is a block diagram showing a microcontroller and related circuitry that provides distributed control functionality and a simple programming interface in an actual embodiment of the present invention.

Turning now to FIG. 2, an illustrative microcontroller and related control logic will be described that provides distributed control functionality and a simple programming interface in the actual embodiment of the present invention described herein. As mentioned briefly above, according to the actual embodiment of the present invention described herein, the microcontroller and associated circuitry shown in FIG. 2 is incorporated into each device in a home automation system. By incorporating the same such circuitry in each device, control of the home automation system may be distributed to each device equally. Moreover, by incorporating the same microcontroller and associated circuitry in each device, a simple programming interface may be consistently presented to the user by each device in the system. In this manner, once a user has learned how to program and control one device, they can then program and control others.

At the heart of each device is a CEBus® microcontroller 30. The CEBus® microcontroller 30 comprises a central processing unit 62 and internal memory 64 for executing user programs, paired with functionality for interfacing with a power-line networking protocol, such as the CEBus® protocol from the CEBus® Industry Council, Inc. As known to those skilled in the art, the CEBus® standard (EIA-600) is an open standard for home automation that defines a common language for device communication over various media, including power lines. Those skilled in the art should appreciate that while the CEBus® protocol is utilized for device communication in the actual embodiment of the present invention described herein, other types of protocols may also be utilized.

In the actual embodiment of the present invention described herein, the CEBus® microcontroller 30 comprises a CEWay PL-One from the Domosys Corporation of Sainte-Foy, Quebec, Canada. The CEWay PL-One is a power line transceiver integrated circuit that integrates the CEBus® physical layer and embeds an 8052 microcontroller core. The CEWay PL-One includes 256 bytes of internal data memory, three 16-bit timers/counters, a full duplex serial port, and the ability to access up to 64 kb of external data memory and up to 64 kb of external code memory.

In the embodiment of the invention described herein, the CEWay PL-One is paired with an external random access memory ("RAM") 32, an external read-only memory ("ROM") 34, and a writable non-volatile memory 36, such as flash memory. As will be described in greater detail below, the non-volatile memory 36 may be used to store and retain scene settings for the device when power is removed. These memory devices may also store computer readable instructions, data structures, program modules or other data necessary for providing the functionality described herein.

The CEBus® microcontroller 30 is also paired to a load 50 through a load controller 52. The load 50 comprises an electrical load, such as that provided by a lamp or other home appliance. The load controller 52 may be capable of sensing the level of the load 50 and is capable of setting the load 50 to a particular level. The load controller 52 communicates to the CEBus® microcontroller 30 so that sensing the level of the load 50 or setting the load 50 to a particular level may be accomplished under programmatic control. According to the actual embodiment of the present invention described herein, the load controller 52 may comprise a triac, for gradually varying the level of a load, or a relay for switching a load on or off. Other types of load control devices such as latching relays, bi-state relays, or other devices known to those skilled in the art may be utilized. The load 50 and load controller 52 may also be electrically isolated from the CEBus® microcontroller 30 through the use of a switch 54, such as an air-gap switch.

The CEBus® microcontroller 30 may also interface with an alternating current ("A/C") power line 58 through the use of a 2-way bus communication driver 56. The 2-way bus communication driver 56 receives data transmitted on the A/C power line 58 and converts this data to a signal compatible with the CEBus® microcontroller 30. The CEBus microcontroller 30 may be electrically isolated from the A/C power line 58 through the use of a switch 60, such as an air-gap switch. As known to those skilled in the art, the CEBus® microcontroller 30 may also receive electrical power from a power supply 38 and a clock signal from a clock 40.

The CEBus® microcontroller 30 also interfaces with several input and output devices. In particular, the CEBus® microcontroller 30 interfaces with a light emitting diode ("LED") controller 44. The LED controller 44 provides functionality for driving one or more LEDs mounted on the device. As will be described in greater detail below, the LEDs may be used to provide an indication to the user as to whether the device is in a normal operation mode, a programming mode, or in another state.

The CEBus® microcontroller 30 also receives input from a number of front panel switches 46. The front panel switches 46 may be mounted on a panel of the device accessible to the user. These switches may be utilized to control a local load 50, or to trigger a scene that includes other devices. Additionally, a dedicated setup button 42 may be provided for placing the device into a programming mode. According to the actual embodiment of the present invention described herein, the setup button 42 is located behind a face plate of the device to prevent inadvertent selection of the programming mode. Other physical inputs 48 may also be provided to the CEBus® microcontroller 30, such as a timer. The front panel switches 46 and the setup button 42 are described in greater detail below with respect to FIGS. 3A–3C.

Referring now to FIG. 3A, an illustrative switch device 10 will be described. In the actual embodiment of the present invention described herein, the switch device 10 provides a primary interface for a user to the home automation system. In particular, the switch device 10 may be utilized by the user to control a local load, to program a scene, and to trigger a scene. In this regard, the switch device 10, including the CEBus® microcontroller and related circuitry, is mountable within a standard wall-mount switch plate receptacle. Those skilled in the art should appreciate while the switch device 10 is described herein as the primary interface to the home automation system, the functionality and interface provided by the switch device 10 for controlling loads, programming scenes, and launching scenes may be similarly provided by other types of devices.

As described above, the switch device 10 includes the CEBus® microcontroller and related circuitry for interfacing with the home automation system and for providing the simple user interface. The switch device 10 also includes one or more buttons 70A–70B. In the actual embodiment of the present invention described herein, one of the buttons 70A–70B is dedicated for local load control. The local load control button may utilize a dimmer to gradually change the value of the local load to which the switch is connected, such as a light. Alternatively, the local load control button may be utilized in connection with a relay for turning the local load on or off.

If the local load control button utilizes a dimmer, the button may be held down to gradually ramp the local load from an off state to a maximum value state. When the local load reaches its maximum value state, the dimmer may then gradually return the load to its off state. As will be described in greater detail below, scenes may be assigned to the remaining buttons on the switch device 10. These buttons may then be utilized to trigger the assigned scene. Those skilled in the art should appreciate that the switch device 10 may be provided in a three-button or four-button configuration as shown in FIGS. 3B and 3C, respectively. Other configurations of the buttons on the switch device 10 will be apparent to those skilled in the art.

The switch device 10 also includes a visible LED 74. The LED 74 comprises a tri-state LED capable of displaying the colors red, amber, and green. The LED 74 may be utilized to provide a visual indication to a user regarding the current state of the switch device 10. For instance, one color of the LED 74 may indicate to the user that the switch device 10 is in a programming state and another color may indicate that the switch device 10 is in a normal operating state. The LED 74 may also be flashed in patterns in combination with the colors to provide other types of notifications. The LED 74 is controlled by the LED controller 44 described above with reference to FIG. 2.

The switch device 10 also comprises a setup button 42. As will be described in greater detail below, the setup button 42 is utilized to place the switch device 10 into one or more programming modes. In order to avoid inadvertent selection of the setup button 42, the button is mounted behind a switch device cover 78. In order to access the setup button 42, therefore, a user would have to remove the retaining screws and the switch device cover 78. If the local load control button utilizes a dimmer then the switch device 10 also includes an air-gap switch 72 for electrically isolating the local load from the power source.

Figure 4:
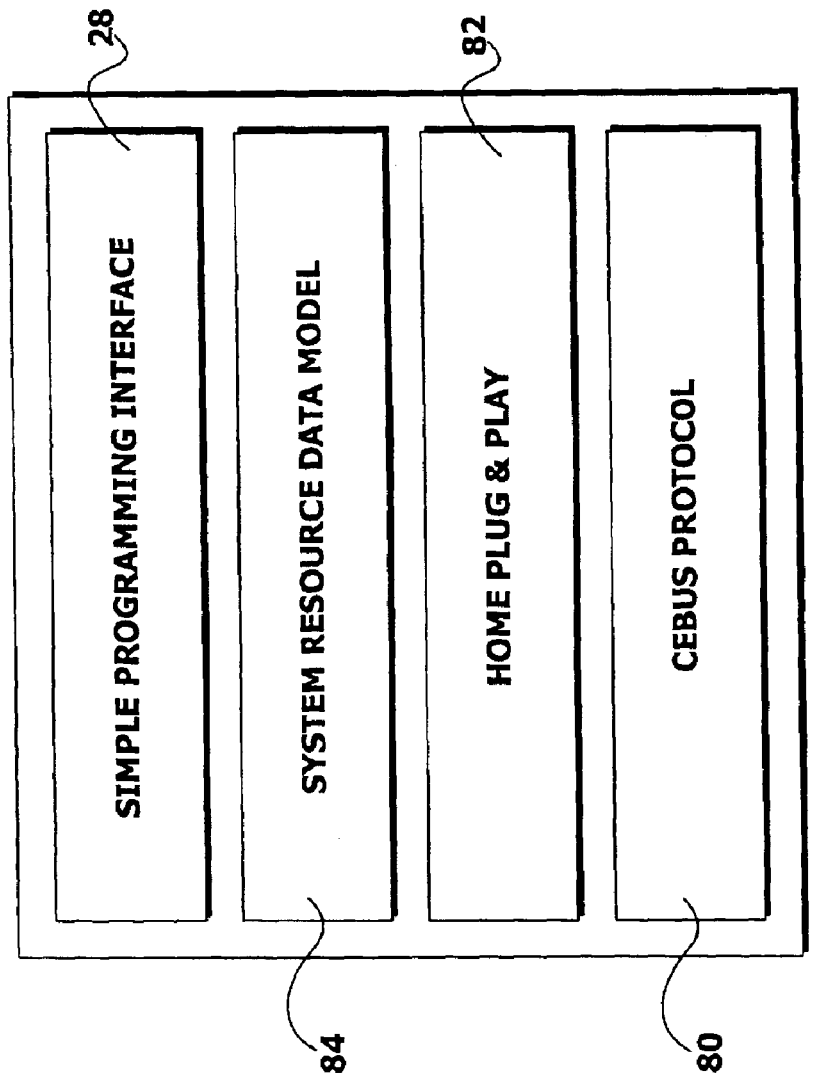
FIG. 4 is a block diagram showing an illustrative software architecture utilized in an actual embodiment of the present invention.

Turning now to FIG. 4, an illustrative software architecture for implementing aspects of the present invention will be described. As described briefly above, each device utilized in a home automation system according to the present invention includes a microcontroller and related circuitry for distributing control of the home automation system to each device and for providing a simple programming interface. To provide such functionality, each device implements the CEBus® protocol 80 for low-level communication.

As known to those skilled in the art, the CEBus® protocol uses 120 v, 60 cycle, electrical wiring to transport messages between devices. Particularly, the CEBus® protocol 80 uses spread spectrum technology to overcome communication impediments found within electrical powerlines. Spread spectrum signaling works by spreading a transmitted signal over a range of frequencies, rather than using a single frequency. The CEBus® protocol 80 spreads its signal over a range from 100 Hz to 400 Hz during each bit in a data packet. However, instead of using frequency hopping or direct sequence spreading, the CEBus® protocol 80 sweeps through a range of frequencies as it is transmitted. As mentioned above, the CEWay PL-One from the Domosys Corporation implements the physical layer of the CEBus® protocol 80. Other layers of the CEBus® protocol 80 may be implemented in software.

One layer above the CEBus protocol 80 sits the Home Plug & Play protocol 82, also from the CEBus Industry Council, Inc. The Home Plug and Play protocol 82 implements the Home Plug and Play Specification that provides a uniform implementation for using the Common Application Language ("CAL")(EIA-721), from the Electronic Industries Alliance ("EIA"), as a language for inter-device communication. CAL is a high-level command language used by devices communication over CEBus®. The Home Plug and Play protocol 82 provides uniform implementation rules for CAL, accommodates various communication protocols so that it works with multiple home network transports, defines common household objects through an object-oriented language, formalizes status, listener, and request objects, uses loose coupling to share status reports, and provides other functionality as known to those skilled in the art.

A system resource data model ("SRDM") 84 sits above the Home Plug and Play protocol 82. Each house scene stored by a device requires a house scene instance in the device. To enable the device to be a member of many different house scenes, where the device load level in each house scene may be very different, the device requires an internal device instance for each desired house scene. The SRDM 84 enables a device to be a member of multiple house scenes by providing a method to configure and bind (and unconfigured and unbind) specific internal device instances to specific network resource instances using a macro. A macro defines device interactions and specifies state transitions caused by message arrival and timeout. House scene programming can not be performed without the SRDM 84 method, but the SRDM method is not limited to house scenes. The SRDM 84 also enables defines a new administrator role, and gives contexts the ability to assign allowed roles, selected role, and role protection. The SRDM 84 enables the selected resource roles to be changed dynamically in a consistent manner. Those skilled in the art should appreciate that the SRDM 84 is protocol independent and may be implemented using many types of protocols, such as the Simple Control Protocol, the Universal Plug and Play protocol, the IEEE-1394 protocol, and other protocols known to those skilled in the art. The SRDM 84 is described in greater detail below with reference to FIGS. 15–17.

Just above the SRDM 84 sits code for implementing the simple programming interface ("SPI") 28. The SPI 28 provides a simple and consistent interface for programming scenes and multi-way lighting contexts within a home automation system having distributed control as provided herein. The SPI 28 is described in greater detail below with respect to FIGS. 6–14. The SPI 28 draws on both the standard Home Plug and Play protocol 82 and SRDM 84 to perform the needed functionality.

Figure 5:
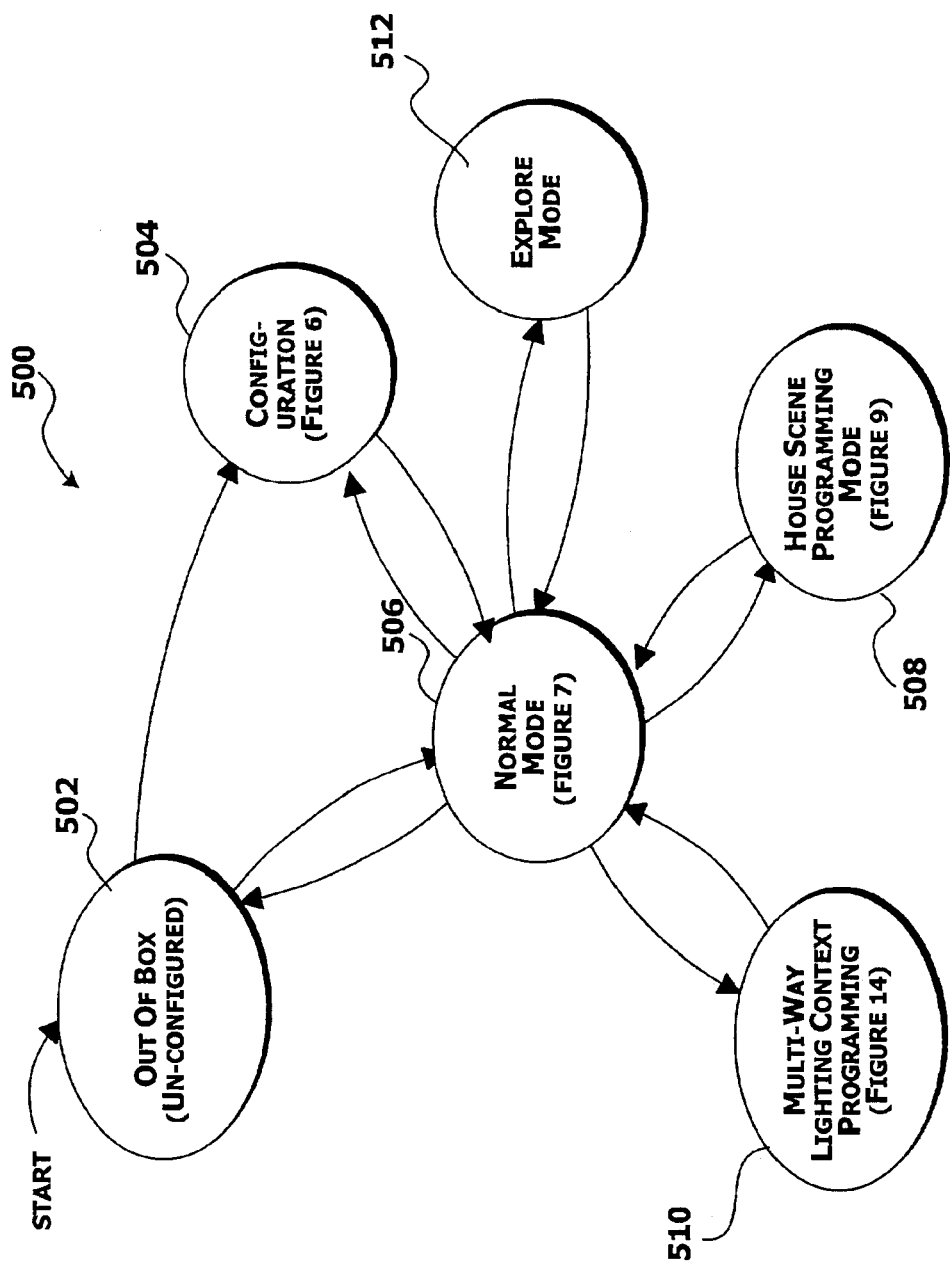
FIG. 5 is a state diagram showing the major states of operation of a home automation system device according to an actual embodiment of the present invention.

Referring now to FIG. 5, an illustrative state machine 500 will be described showing the major states of operation of a home automation system device according to the actual embodiment of the present invention described herein. The state machine 500 begins at state 502. State 502 is the "out-of-box" unconfigured state that a device is shipped from the factory in. An unconfigured device must be configured into an existing or new home automation system by providing the device with a network identifier, also called a house code, and a unique unit address within the house code. To configure the device, the state machine 500 moves to state 504. An illustrative state machine for configuring a new device is described below with respect to FIG. 6. An already configured device may be placed temporarily in state 504 to serve as the configuration master, to assure that the other unconfigured devices are configured to use the existing house code in the network configuration process.

Once a new device has been configured at state 504, the state transitions to state 506. State 506 is the normal mode of operation for the device. In the normal mode of operation, the device may be utilized to control its local load, or to launch scenes. An illustrative state machine for the normal mode is described below with reference to FIG. 7. From state 506, the device may move to state 512. State 512 provides an "explore mode" through which the serial number, house code, and unit address for a device may be discovered programmatically. When the explore mode is exited, the state returns to state 506.

From state 506, the state may also move to state 508, where the house scene programming mode is entered. In the house scene programming mode, a device may be programming manually using the simple programming interface, or may be programmed through a software tool connected to the home automation system using a PC port. Scene programming utilizes the SRDM 84 configuration and binding method, and the software tool programming requires the use of the SRDM 84 macro messages. An illustrative state machine for the house-scene programming mode is described below with reference to FIG. 9. When the user exits house-scene programming mode, the state returns to state 506.

From state 506, the state may also change to state 510. State 510 defines a multi-way lighting context programming mode. In this mode, a group of lighting devices may be programmed to directly control each other as a group. Devices without a lighting context will not have the multi-way lighting context programming mode. When the user has completed programming the multi-way lighting context, the state returns to state 506, the normal mode. An illustrative state machine for providing the multi-way lighting context programming mode of state 510 will be described below with reference to FIG. 14. A trigger button from a device that is not a multi-way member may also directly control the multi-way group of lights.

Figure 6:
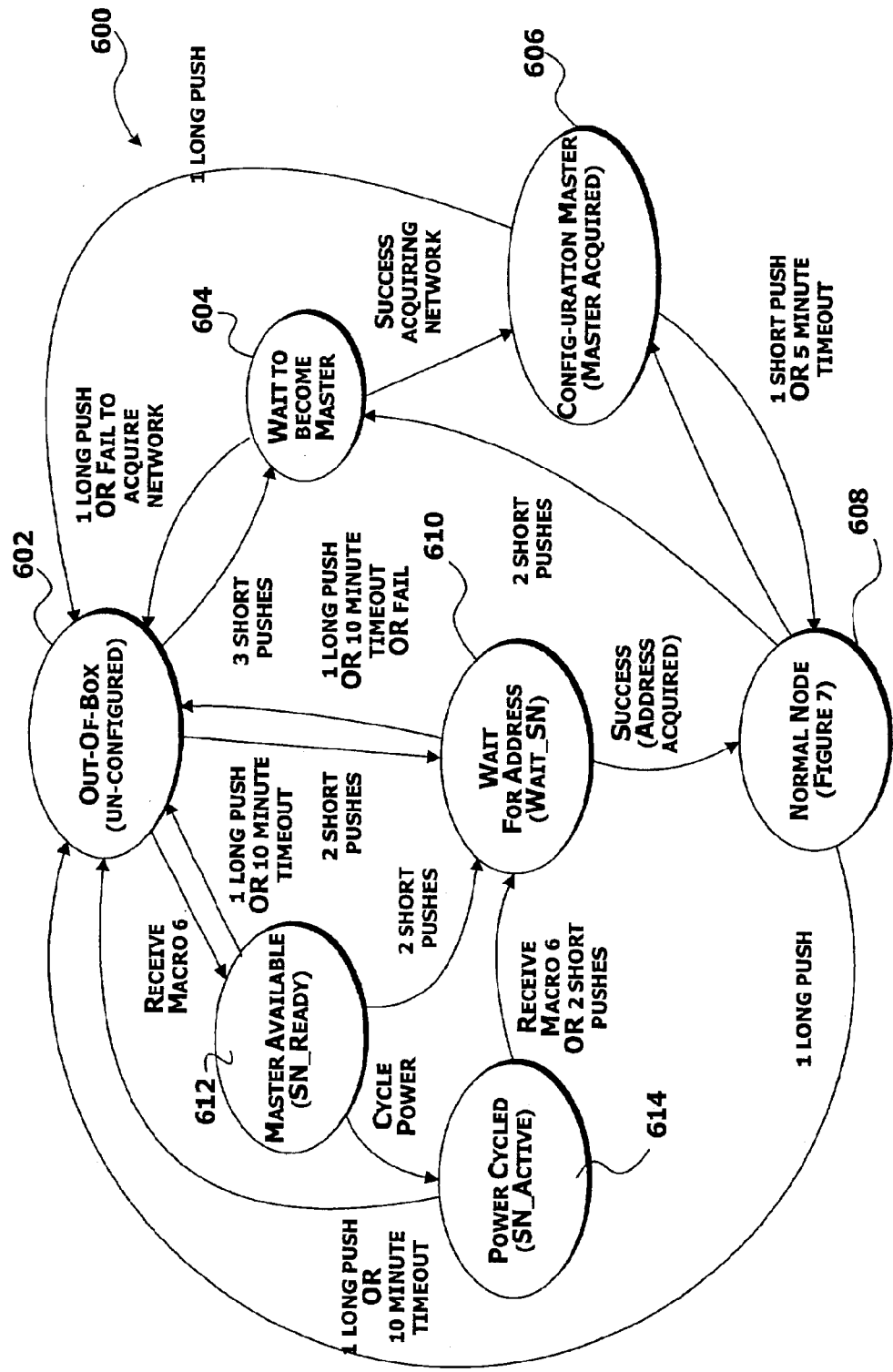
FIG. 6 is a state diagram showing an illustrative state machine for configuring a home automation system device according to an actual embodiment of the present invention.

Turning now to FIG. 6, an illustrative state machine 600 will be described for configuring a home automation system device. The state machine 600 begins at state 602, which is the unconfigured state for a device. As mentioned briefly above, devices come unconfigured from the factory and must be configured into a new or existing network of devices. Unconfigured devices may be configured using a completely manual procedure or may be configured using a quick configuration process. According to either process, one device in a network of devices must be made a configuration master. The configuration master configures unconfigured devices in the network by assigning them unique addresses.

To configure devices manually, a manual indication is provided to one device to become the configuration master, such as pressing the setup button on the device a certain number of times. In an already configured device this causes the state machine at normal mode 506 to change from state 608 to configuration master state 606. In an unconfigured device, this causes the state machine 600 to change state from state 602 to state 604. At state 604, the device attempts to become a configuration master by acquiring a unique house code for the network. If the device has been previously configured into an existing network, the device will already have such a house code. If the device cannot obtain the house code, the state machine returns to state 602. If the device obtains a house code, the state machine 600 changes state from state 604 to state 606, where it becomes a configuration master. In this state, the device assigns other unconfigured devices within the network unique unit addresses. Another manual indication, or a timeout, may cause the state machine 600 to transition from state 606 to state 608. In state 608, the device returns to the normal mode.

In order for unconfigured devices to receive a unit address from the configuration master, these devices must be manually told to allow themselves to be configured. For these devices, the state machine begins at block 602 and moves to block 610 when such an indication is received. At block 610, the device waits for a unit address from the configuration master. If a timeout occurs or a manual indication is received returning the device to an unconfigured state, the state machine 600 returns to state 602. If the device successfully obtains a unit address, the state machine 600 changes state to state 608. At state 608, the device enters the normal mode described below with reference to FIG. 7. From state 608, a configured device may become a configuration master by receiving the appropriate manual indication.

As mentioned briefly above, unconfigured devices may also be configured using a quick configuration process. According to this process, all previously unconfigured units may be configured by removing the power to the network after a configuration master has been obtained. More particularly, a configuration master is obtained by providing a manual indication to a previously configured device. In an unconfigured device this causes the state machine to move from state 602, to state 604, to state 606. When the device becomes the configuration master, the device sends a macro command to all other devices in the network indicating that a configuration master is active in the network. This causes all of the unconfigured devices in the network to move from state 602 to state 612.

Once the unconfigured devices move to state 612, they save information indicating that a configuration master is active in the network to non-volatile memory. In this manner, the information is available to the device even if power is lost. At this point, an operator removes power to the entire network through cycling a circuit breaker or through other means. When the configuration master powers up, it returns to its configuration master state, state 606. When the unconfigured devices power up, they sense that the power has been cycled and search for the saved information. If the saved information is located, the unconfigured devices move to state 614. When the device receives an indication that the configuration master is back up and active in the network the device goes to state 610 where they wait for a unit address. The configuration master then transmits the unique unit address to each unconfigured device. Once the unit address has been obtained, the devices change state to state 608. If a device does not receive a unit address, a timeout occurs, or a specific manual indication is received, the device may return to state 602. Through this quick configuration process, an entire network may be configured without having to manually instruct each unconfigured device to receive a unit address.

Configured devices may also be returned to an unconfigured "out-of-box" state. One issue, however, with returning a device to an unconfigured state is purging any "dangling subscribers." Dangling subscribers are scenes that cannot be launched because the device that was returned to the unconfigured state comprised the only trigger for the scene in the home automation system. When a device is reset to the unconfigured state, it will cease to operate in any resource role it served prior to the reset. If the device was serving as the sole requester, or trigger, for a scene, it must determine if the network bindings for this resource should be purged throughout the system. To avoid this problem, when a device is reset to the unconfigured state, the device will perform a check to determine whether it is the sole requester for each button that is bound as a trigger. If the button is the sole trigger for a scene or other system resource, then the device is responsible for purging the system of the resource. The same process flow described below with reference to FIG. 11 for the state diagram for trigger availability analysis is utilized to perform this process.

The home automation system devices provided by the actual embodiment of the present invention described herein operate predominately in a mode called the "normal mode." Activation of scenes and general control of attached loads occurs while in this mode. This is also the default mode at power-up of a configured unit unless power has been cycled while the device was in the programming mode as described above.

In order to launch scenes and control a local load, devices have a basic device specific context and a set of house scene context instances. A context instance is a collection of instance variables ("IV") together with rules that may alter the variables. The basic device specific context is specified in the Home Plug and Play Specification and is described only briefly herein. The house scene context allows interoperability between different types of devices. Launching a house scene can modify the behavior of light and heating, ventilation, and air conditioning ("HVAC") devices simultaneously, for instance, without sending separate lighting context and HVAC context commands. This process is described in greater detail below.

The house scene concept is one of distributed control. Each device that is a subscriber member to a house scene maintains a scene description that identifies what the device is to do when a message is received indicating that the house scene should be launched. Conversely, a house scene requester trigger is able to launch a house scene without knowing what devices are participating in the house scene, how many devices there are, or what each device is to do.

Each device with a load control may be a subscriber to multiple house scenes. A device may be a requester for as many house scenes as it has trigger buttons, with each trigger button triggering just one house scene. More than one button on a single device can trigger the same house scene. The application firmware executing on the microcontroller will keep track of which house scene, if any, is currently active. Each house scene is assigned one device that acts as an administrator and is responsible for maintaining house scene integrity while programming and in normal operation. The administrator role is usually placed with the device whose trigger button first captured that house scene. The administrator role may be transferred to another device if required.

Figure 7:
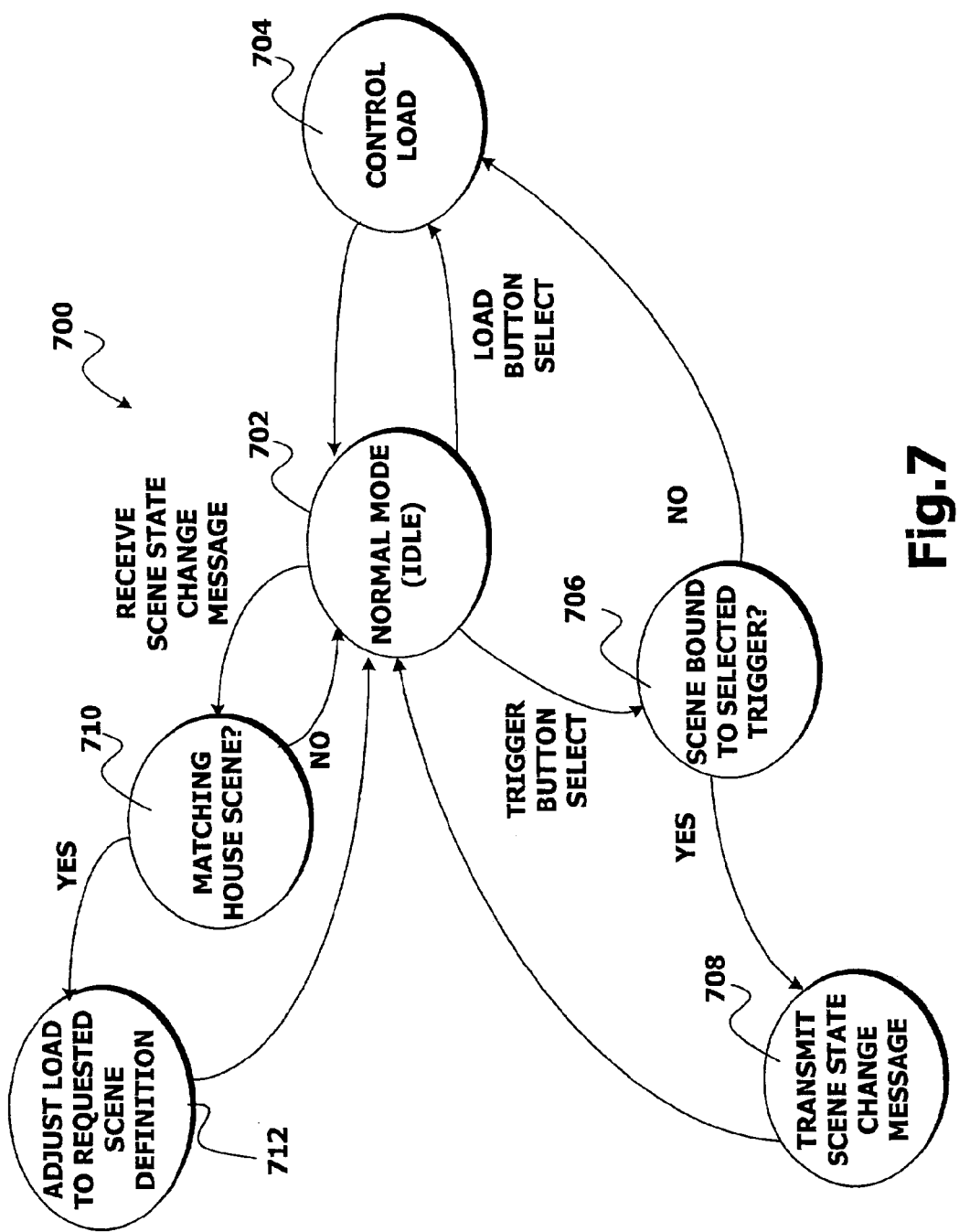
FIG. 7 is a state diagram showing an illustrative state machine for providing a normal mode of operation of a home automation system device according to an actual embodiment of the present invention.

Referring now to FIG. 7, an illustrative state machine 700 for providing a normal mode of operation for a home automation system device will be described. The state machine 700 begins operation in the normal mode idle state 702. In the normal mode idle state 702, the device awaits messages indicating that the device should adjust its load to match a scene definition, and awaits input indicating that the local load should be adjusted or that a scene should be launched. When input is received, the device takes the appropriate action.

If the load button of a device is selected, the state machine 700 transitions to state 704, where the load is controlled. Control of the load may include turning the load on or off, or ramping the value up or down. Once the state machine for controlling the local load has completed, the state machine 700 returns to the normal mode idle state 702.

If a trigger button of a device is selected, the state machine 700 changes state to state 706, where a determination is made as to whether the selected trigger button is bound to a house scene. As mentioned above, a house scene is launched when a trigger button is pressed that house been bound to a house scene. If the trigger button has been bound to a house scene, the trigger button press initiates the transmission of a message telling the network what house scene to activate or deactivate. The message does not tell other devices how to implement a particular house scene, it only identifies a particular house scene to be activated. Therefore, if the device determines at state 706 that the selected trigger is bound to a scene, the state machine moves to state 708. At state 708, the scene state change message is transmitted to all devices on the network, including the device upon which the trigger was pressed. If the selected trigger is not bound to a scene, the button acts like a fixed value load button, and the state machine goes to 704 where the load is set to the default unbound button value. The device then returns to the normal mode idle state 702.

The scene state change message transmitted in 708 depends on whether that scene is currently compromised. A device may be a member of multiple scenes. If a device has adjusted its load after receiving a scene state change message for scene A, and then receives a scene state change message for scene B, the load is adjusted to scene B levels, and the A scene is now compromised. When a scene becomes compromised, the device informs all other member subscribers and triggers of scene A that scene A has been compromised. In state 708 if the newly selected scene is currently active and uncompromised, a scene deactivate message will be transmitted. If the selected scene is not active or is compromised, a scene activate message will be transmitted. The concept of a compromised scene is described below with respect to FIG. 8. Each device may then respond accordingly to the received message. The state machine 700 then returns to the normal mode idle state 702. Optionally, a trigger button can be set to trigger scene activations only. The SRDM 84 role method reduces the complexity needed for the scene compromised device to inform both the other member subscribers and the scene triggers that the scene has been compromised with one scene modified message.

If a scene state change message is received at the device, the state machine 700 changes state from the normal mode idle state 702 to state 710. At state 710, a determination is made as to whether the device is a subscriber of the scene. In particular, the device looks for a matching house scene channel number. If a matching house scene channel number is not found, the state machine 700 returns to state 702. If a matching house scene channel number is found, the state machine 700 moves to state 712. At state 712, the local load is adjusted according to the message received and the scene definition stored in the device. If the scene message received is a deactivation the scene will be deactivated. If the scene message is activate, the load controlled by the device is adjusted to match a scene definition corresponding to the house scene channel number. This may include turning the local load on or off, or adjusting the local load to a particular intermediate value. The state machine 700 then moves from state 712 back to the normal mode idle state 702.

As discussed above, a house scene determines the load state, and load levels if applicable, of any devices that subscribe to the scene. The house scene compromised concept allows the system to be aware when an active scene loses control over one of its subscriber members. The scene may be compromised due to human intervention from a manual load control on the device, a self-aware device such as a timer was told to do something and it is done (e.g. a hot water heater the was turned on and reached it's required temperature), or a new scene was activated that shares some of the old scenes subscriber members.

By default, any time a device is aware that it has been removed from an active scene, it will signal that the scene has been compromised. All other subscribers and requesters to that scene will see that message and set that scene to compromised. By default they will take no other action. If more than one load is modified in a scene, only the first device modified will broadcast that the scene was compromised. The other devices having received the scene modified message will have already set the scene state to compromised. So, as further loads drop out of the scene, they are already aware that the scene has been compromised and they will not send duplicate scene compromised messages. This minimizes the number of messages on the home automation system network.

This same concept is used by the default action of trigger buttons to reduce repetitive pushes. If two scenes share the same resources, toggling between the two scenes will only require one button press by default. Once a scene has been compromised, its trigger button will be set to send a scene activation and not a scene deactivation. Otherwise the default action of a repetitive trigger push is to toggle between scene activation and scene deactivation.

Figure 8:
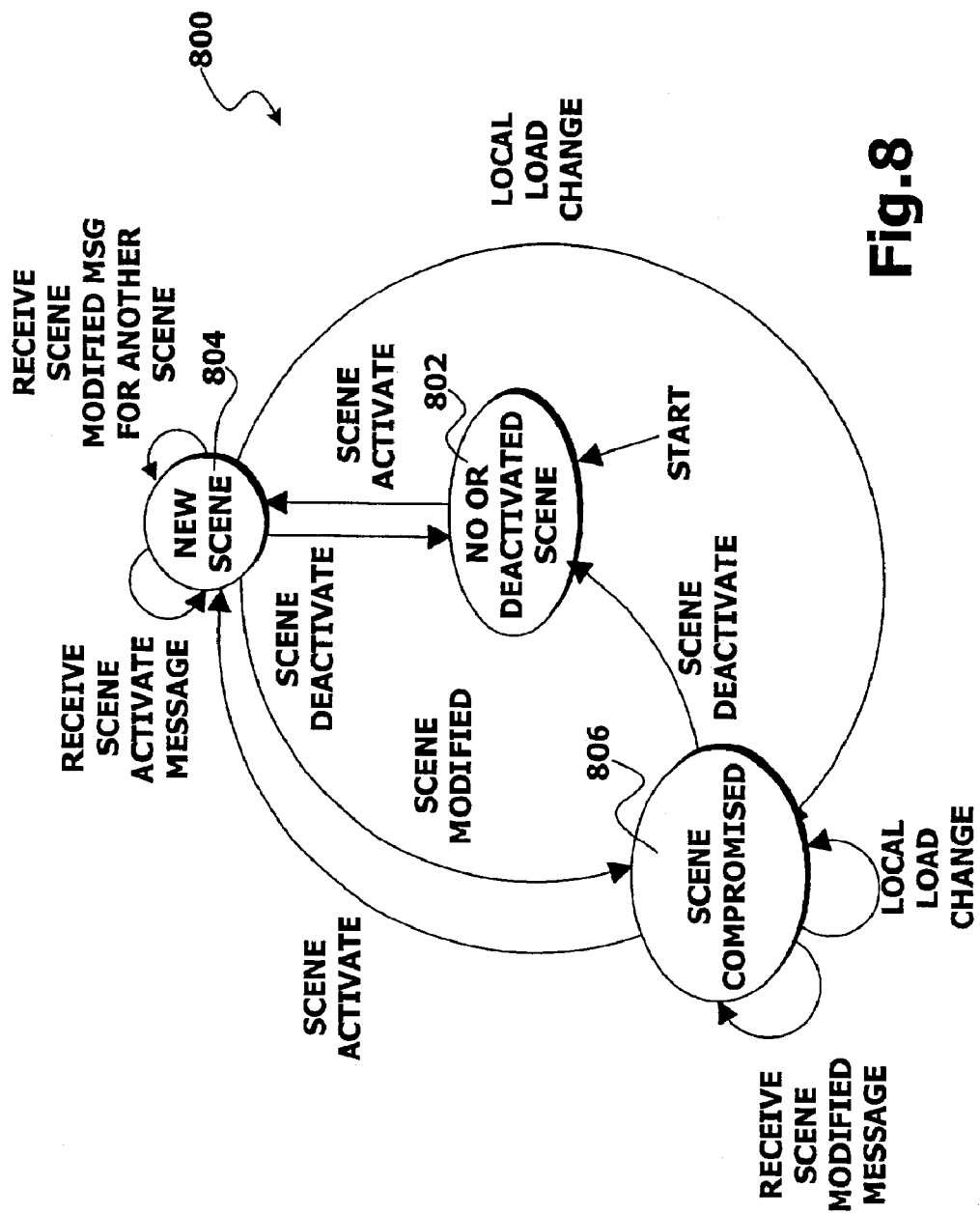
FIG. 8 is a state diagram showing an illustrative state machine for maintaining the compromised status of a scene according to an actual embodiment of the present invention.

Referring now to FIG. 8, an illustrative state machine 800 will be described for maintaining the compromised status of a particular scene according to an actual embodiment of the present invention. Each scene has its own state machine 800. The state machine 800 begins at state 802, where a scene has not been activated or a scene deactivate message has been received. If a scene activate message for that particular scene is received while in state 802, the state machine 800 moves to the new scene.

If a new activate scene message for that particular scene is received while at state 804, the state remains the same. Likewise, if a scene modified message is received for any other scene, the state remains at state 804. If a local load change occurs while in the new scene state 804, the state machine transitions to state 806. If a scene message is received for a different scene, that scene takes affect, the original scene is modified, and original scene state transitions to state 806. Similarly, if a scene modified message for that particular scene is received from another device, the state moves to state 806.

If another scene modified message for that particular scene is received while at state 806, the state remains at state 806. Likewise, if a local load change occurs, the state remains at state 806 and a scene modified message will not be transmitted. If a new scene state change message for that particular scene is received while in the scene compromised state 806, the state moves back to state 804. If a scene deactivate message is received while at state 806 or in state 804, the state machine returns to the no or deactivated scene state 802.

Figure 9:
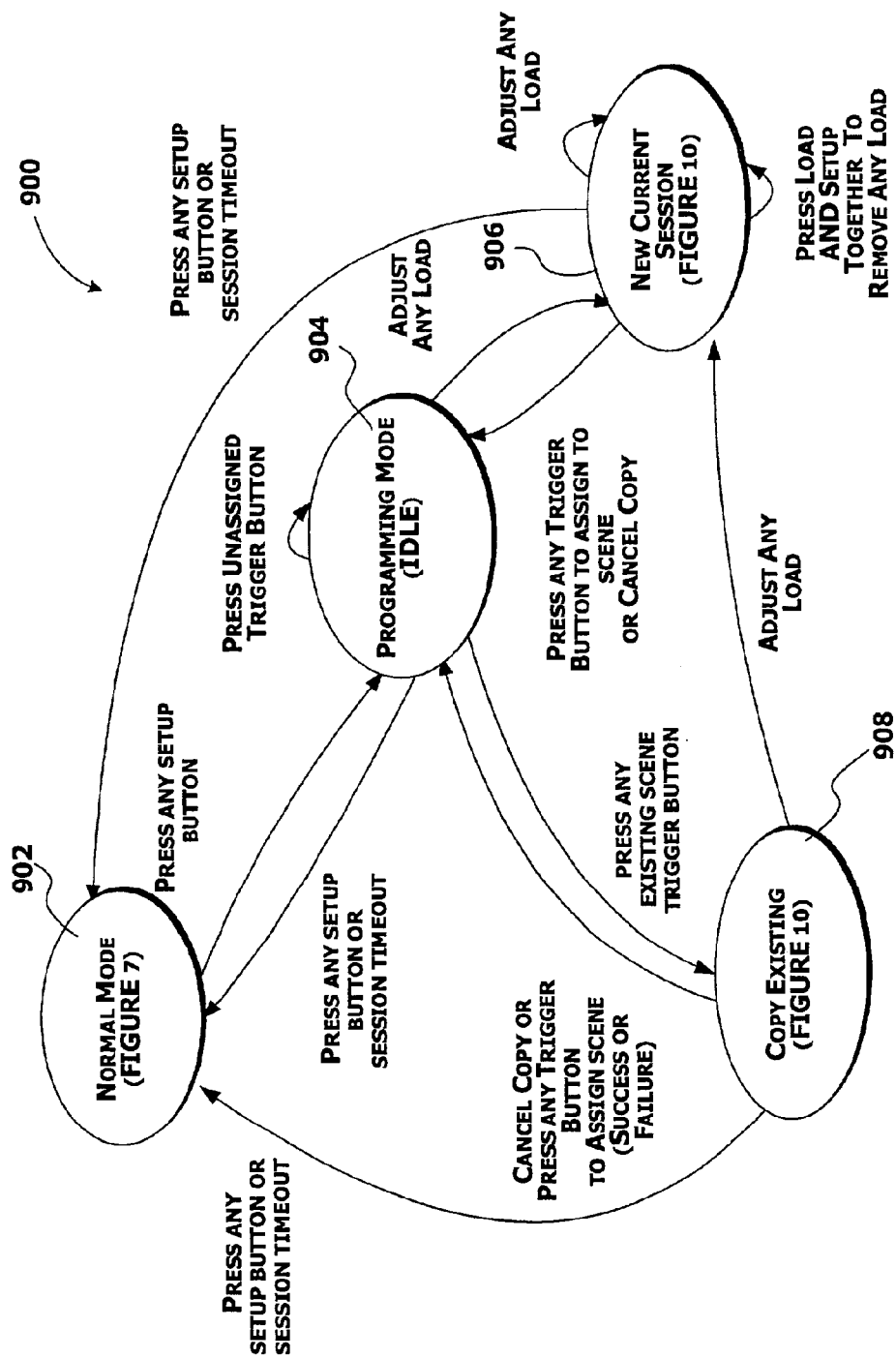
FIG. 9 is a state diagram showing an illustrative state machine for providing a simple programming interface in an actual embodiment of the present invention.

Referring now to FIG. 9, the simple programming interface provided by an actual embodiment of the present invention will be described. The simple programming interface is provided through a scene programming mode. The scene programming mode is used to setup house scenes by selecting the subscribers, requesters, and administrators of a scene. To understand how the user interface functions during scene programming, it is important to remember that at least one button of a device is dedicated to local load control. Any additional buttons are available for assignment as "triggers" for activating programmed scenes. The load control button is used to identify a device as a subscriber to the scene, and the trigger buttons are used to select the requester devices, or devices that will trigger the scene.

During manual programming of a scene using the device buttons to set up and assign scene membership, a design concept known as the "current scene" must be considered. The "current scene" is a temporary set of elected and incumbent house scene member loads of the scene being programmed. Load membership election is attained through adjusting the brightness level, or operating state, of the load on the load button of each member device. Devices in programming mode that receive a command to activate a previously captured scene and that are already members of that previous house scene automatically become incumbent members in the new "current scene." Up until the "current scene" is "captured," current members can always be removed and new ones added. Once a house scene has been "captured", membership in the scene is fixed. The scene can be deleted (overwritten by another scene), copied or have membership in the scene used as the basis for a new scene, but once a scene is captured the membership in the scene can not be modified using the simple programming interface.

A current scene programming session can also be canceled. The current scene does not survive a transition to the idle state of the programming mode or the termination of a programming session. That means that if a scene is not "captured" before the device transitions to the programming mode idle state, the "current scene" is cancelled. Any membership information related to the current scene is discarded when these transitions occur. Typically the transition to the idle state of the programming mode occurs because the user "captures" the scene by assigning the current scene to a trigger button somewhere in the system. When this assignment occurs, the information in each member is transferred to other permanent internal storage resources available within each member and this information is then associated, or bound, to a unique house scene identifier. This identifier is used to activate the captured load levels that define this scene for each of its members.

The state machine 900 for implementing the house scene programming mode will now be described. The state machine 900 begins at the normal state 902, which is described above with reference to FIG. 9. Pressing the setup button on the device once causes the state machine 900 to transition to the programming mode idle state 904, which initiates the house scene programming session. The device that is used for establishing programming mode is called the programming mode initiator ("PMI"). The PMI needs an available network channel instance for the house scene being programmed. It obtains this channel number through a process called resource channel hailing. This process in done in the background so that appropriate network channel for the new scene will have been identified by the time the channel number must be transmitted to other devices. Background resource channel hailing is described in greater detail below.

As described above, it may necessary for a user to remove the cover plate of a switch device to gain access to the setup button. Any number of house scenes can be programmed during a single session. The session is not over until the system is commanded back into the normal state 902. This may be accomplished by pressing the setup button on any device again, or by the programming session timing out due to the absence of user input over a period of a preset amount of time. While in the programming mode idle state 904, any load button may be utilized to adjust the value of a scene member. When this occurs, the adjusted device will leave the programming mode idle state 904 and transition to the new current session state 906. When all subscribers to the new scene have had their levels adjusted, the user may select a trigger button to capture the scene that will launch the scene in normal mode. Once a trigger is chosen, all the devices return to the programming mode idle state 904. Another scene can now be programmed. In the new current session state 906, the selection of the load button and the setup button at the same time will remove the device from the scene. Additionally, the selection of the setup button will return the device to the normal mode. The new current session state 906 is described in greater detail below with reference to FIG. 10.

From the programming mode idle state 904, a user may also create a new scene from an existing scene. To copy an existing scene in this manner, a trigger for that scene must be pressed as the first event following the initiation of a new house scene programming session. This will cause the device to transition from state 904 to the copy existing state 908. If a new trigger button is immediately selected, the new trigger button becomes another requester "trigger" of the old existing scene. If, after the scene is copied, any loads are adjusted before the trigger is selected, then the state machine 900 transitions to the new current session state 906. The copied subscribers will remain as members of the new current scene unless removed. When a trigger is then selected, it is the requester of the new house scene. The old scene still exists unless the selected trigger was the only requester for the old scene. The setup button may be utilized to end programming and return the device to the normal state 902. A timeout may also return the state to the normal state 902. The copy existing state 908 is also described in greater detail below with respect to FIG. 10.

As mentioned above, a process called background resource channel hailing is utilized to locate an appropriate network channel for the new scene. This process in done in the background so that appropriate network channel for the new scene will have been identified by the time it must be transmitted to other devices. The purpose of this process is to find an available channel for a future house scene to be bound to. This process is done in the programming mode. All the devices in the home automation network must participate in this process by providing their first available internally unused channel to the network depending on certain conditions.

Once a user has defined a scene to be assigned to a trigger button, the process of actual assignment must occur rapidly. It will be unacceptable to the user to have to wait for a resource channel to be acquired through a standard hailing mechanism at this point in the scene programming process. Therefore, the PMI device will be responsible for acquiring a resource channel as soon as the programming mode is entered. This channel number will then be used during the programming session that has been initiated.

The PMI begins the hailing process by selecting channel zero. If the PMI has any instances of the house scene context class bound to the selected channel, it increments the selection and re-evaluates the adjusted channel selection again for any matches. This iterative process continues until no match is found within the set of bound house scene contexts in the PMI. During the PMI's initial analysis, the set of house scene contexts analyzed for a possible match includes administrators as well as subscribers and requesters. Once an unmatched channel has been found, the PMI then transmits a resource channel hailing ("RCH") command to the Home Plug & Play address within the PMI's house code, including the unmatched channel as a parameter.

Any device that receives the RCH command, and contains a House Scene context functioning in an administrator role, and bound to the indicated resource channel will retransmit the macro command. However, before re-transmitting the command, the device will increment the channel number and perform an analysis similar to that performed by PMI when the background resource hailing process started. Once a new channel selection has been made that does not match context bindings checked during the analysis process, the RCH command is re-transmitted with this new channel number as the parameter.

This process of re-transmission of the RCH command by devices in the system continues until a silent period (an absence of the RCH command) is detected by the PMI that lasts for over a preset amount of time. When the PMI has detected that this preset threshold has been crossed, the PMI will retransmit the RCH command using the parameter that was passed the last time it received the macro. This is done for the purpose of double checking the availability of the channel. If the time period once again expires after this transmission, the PMI will consider the channel that was used as a parameter when transmitting the macro to began available resource channel.

Having acquired an available resource channel, the PMI will store this value internally as the next available resource channel. This value can be acquired later on during the scene programming session for use in binding a new house scene by the device having the button selected as the new scene's trigger. The device requesting the next channel value does so by sending a resource channel request ("RCR") command to the Home Plug & Play address. Only the PMI will respond to this macro.

The PMI does two things upon receipt of the RCR command. First it generates a response to the source of the message, returning the value that the PMI had previously stored as the next available channel. Secondly, the PMI increments this value to generate a new channel selection. This new channel is used as the initial value in the channel hailing process, which starts immediately again as a background process and continues as before until a new value is stored for the next available channel or the programming session is terminated.

The next-channel acquisition process is also capable of surviving a power cycle of any device in the system. Therefore, data stored in the PMI regarding whether the next channel has or has not been acquired should survive a power cycle of the PMI device. Ideally, the last known channel selection should also survive a power cycle so that the hailing process does not have to restart at channel zero. In order to provide this functionality, this data may be appropriately saved in the non-volatile memory of the device.

Figure 10:
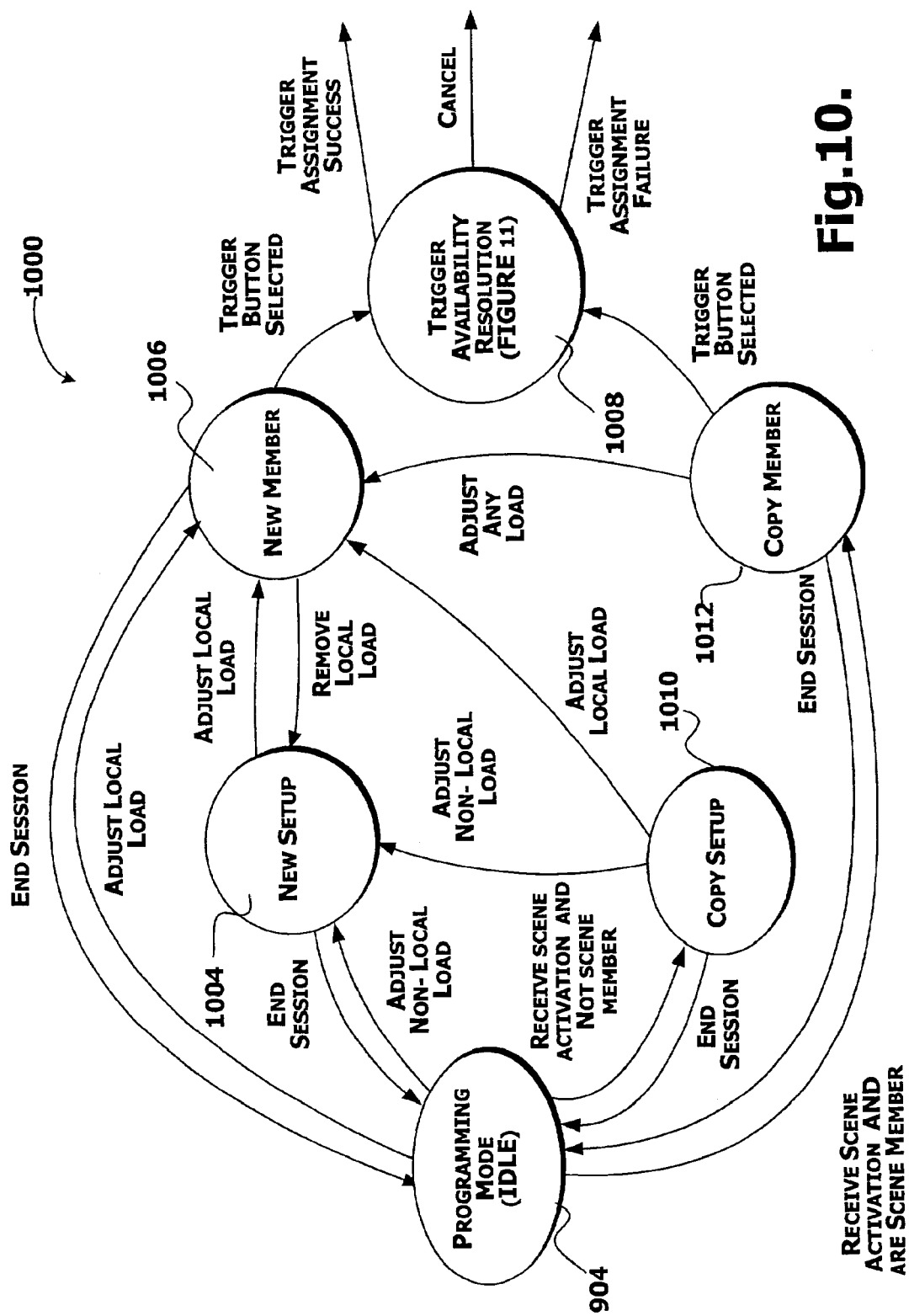
FIG. 10 is a state diagram showing an illustrative state machine for copy and new session sub-states according to an actual embodiment of the present invention.

Referring now to FIG. 10, additional details regarding the new current session and copy existing states will be described. The state machine 1000 shows additional aspects regarding the new scene and copy scene functions described above. Particularly, the new current session state 906, shown in FIG. 9, exists as two separate sub-states, the new setup state 1004 and the new member state 1006. Similarly, the copy existing state 908, also shown in FIG. 9, exists as two separate sub-states, the copy setup state 1010 and the copy member state 1012. These sub-states are described below.

A device enters the new member state 1006 if it has been elected as a member of the current scene by adjusting its load while the system is in the programming mode idle state 904. A device may also enter the new member state 1006 from the new setup state 1004. A device enters the new setup state 1004 if the device has not been elected as a member of the current scene but another device has been elected as a member. The transition to the new member state is made if the local load is adjusted. If the local load is removed, the state machine 1000 will transition back from the new member state 1006 to the new setup state 1004. A device enters the copy setup state 1010 if a scene activation message is received while the device is in the programming idle state 904 and the device is not a member of the current scene. If a registration message indicating that any non-local load has been adjusted is received while in the copy setup state 1010, the state machine 1000 will transition from state 1010 to the new setup state 1004. If the local load is adjusted while in the copy setup state 1010, the state machine 1000 will transition to the new member state 1006. A device enters the copy member state 1012 if a scene activation macro is received while the device is in the programming idle state 904 and the device is a member of the that scene. From the copy member state 1012, the state machine 1000 may transition to the new member state 1006 if the local load for the device is adjusted. From the copy member state 1012, the state machine 1000 may transition to the new setup state 1004 if a message indicating that any non-local load has been adjusted is received. If a trigger button is selected while in the new setup state 1004 or the copy setup state 1010, the session ends because the device is not a member of the captured current scene, and the state machine 1000 transitions to state 904. If a trigger button is selected while in the new member state 1006 or the copy member state 1012, the state machine 1000 transitions to state 1008. At state 1008, a determination is made as to whether the selected trigger button can properly be made a trigger for the current house scene. The trigger assignment may fail, succeed, or be cancelled. All results of the trigger availability analysis return the state machine 1000 to the programming mode idle state 904. Illustrative state machines and a flow diagram for implementing the trigger availability analysis are described below with reference to FIGS. 11–13.

The state machine 1000 may also transition to the idle state 904 from the copy member state 1012, the copy set state 1010, the new member state 1006, and the new setup state 1004 if no session activity happens for more than a preset amount of time since the last session activity.

Figure 11:
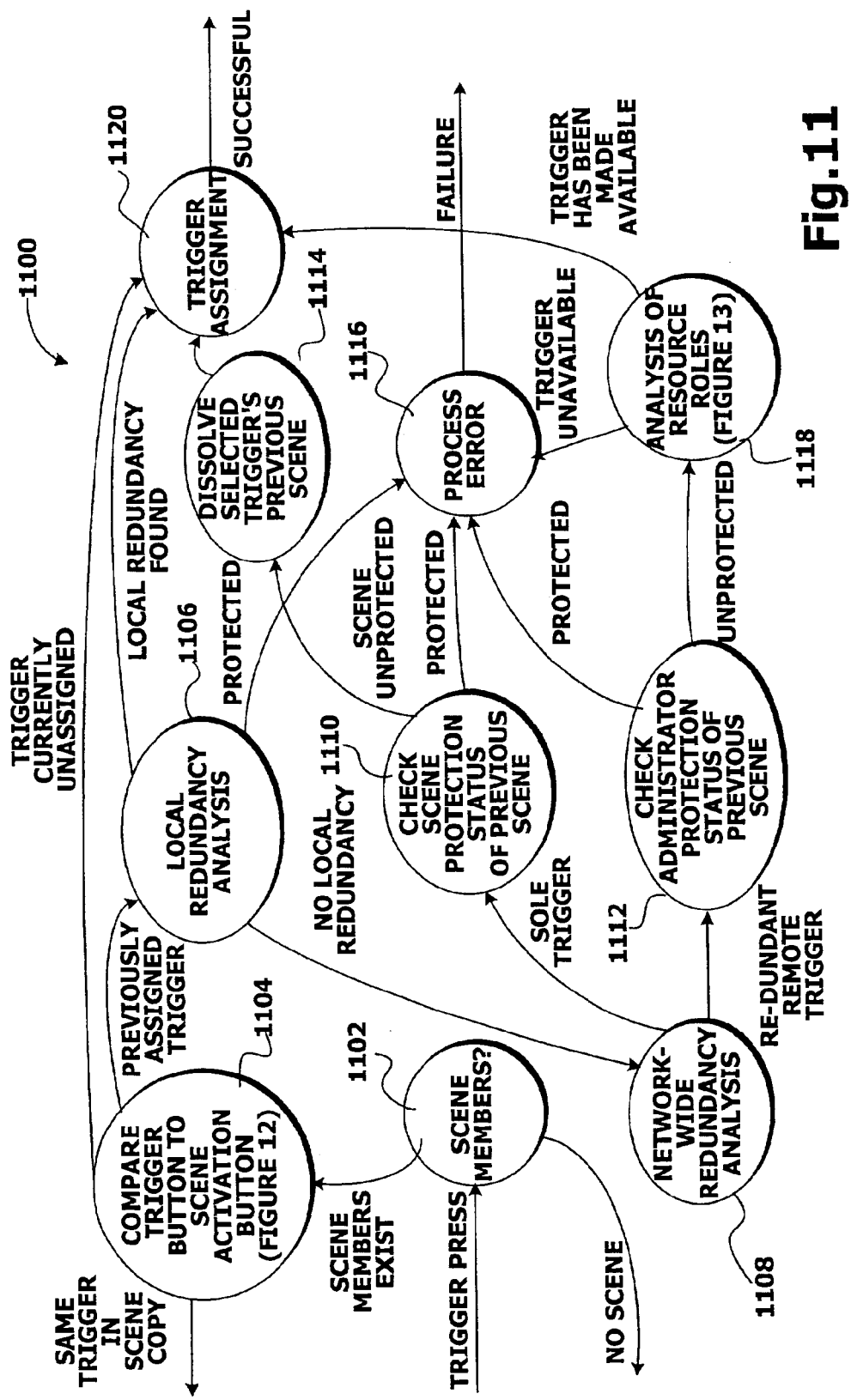
FIG. 11 is a state diagram showing an illustrative state machine for determining trigger availability and performing previous assignment resolution according to an actual embodiment of the present invention.

Referring now to FIG. 11, an illustrative state machine 1100 will be described for determining trigger availability and performing previous assignment resolution. The SRDM 84 roles provide the basis for determining the trigger role availability and the method to modify those roles. As described briefly above with respect to FIG. 10, the state machine 1100 is executed in response to a request to assign a new house scene or copy an existing house scene to a trigger button. In many instances the selected trigger button will already be a trigger for another house scene. Therefore, the association between the selected button and the old scene must be properly dissolved before the selected button can be bound to the new house scene. The state machine 1100 performs this process. This process is transparent to a user of the home automation system except in the case of an error condition.

The state machine 1100 begins at state 1102 in response to a request to assign the selected trigger to a house scene. A scene trigger may be trigger protected so that it cannot be overwritten. If the trigger selected is trigger protected, no scene capture occurs and the state machine 110 returns to idle state 904. Also at state 1102, a determination is made as to whether the new scene actually contains any members. If the new scene does not contain members, such as if all the members were removed, then no scene exists and there is no need to assign the selected trigger button. Therefore, if there are no scene members, the state machine 1100 returns to the programming mode idle state 904 shown in FIG. 10. If scene members do exist, the state machine 1100 transitions to state 1104.

At state 1104, the selected trigger button current assignment status is checked. If the trigger button is currently unassigned, the state machine 1100 transitions to state 1120, where the scene is assigned to the trigger button. If the trigger button has been previously assigned, the state machine transitions to state 1106. If the selected trigger button is the same as the button utilized to activate the current scene, the state machine 1100 transitions to the programming mode idle state 904 shown in FIG. 10. An illustrative flow diagram for comparing the trigger button to the button utilized to activate the current scene is described in detail below with reference to FIG. 12.

At state 1106, a local redundancy analysis is performed to determine if another trigger button on the same device is functioning as a trigger to the scene previously assigned to the selected trigger button. This ensures that at least one trigger button will remain to trigger the scene. If local redundancy is found (i.e. another trigger button is bound to the scene previously assigned), then the state machine 1100 transitions to state 1120 where the scene is assigned to the trigger button. If no local redundancy is found, the state machine 1100 transitions from state 1106 to state 1108, where a network wide redundancy analysis is performed. If the selected trigger is the sole trigger for the scene, the state machine 1100 transitions to state 1110.

Just as the trigger itself, the trigger's previous scene may be protected or unprotected. At state 1110, the protection status of the trigger's previous scene is determined. A scene may be protected so that it cannot be removed. If the scene is protected and since the scene has no other triggers, the state machine 1100 transitions to state 1116, where an error message is generated. If the scene is unprotected, the state machine 1100 transitions to state 1114, where the house scene assigned to the selected trigger is dissolved network wide. To dissolve the scene, the SRDM 84 macro will be transmitted indicating that the particular house scene should be unbound from the assigned resource channel. Once the house scene has been dissolved, the state machine 1100 transitions, to state 1120, where the current house scene may be assigned to the selected trigger. If, at state 1108, a redundant remote trigger is found for the scene, the state machine 1100 transitions to state 1112. At state 1112, the protection status of the selected triggers previous scene administrator role is determined. If the selected trigger administrator role is protected, the state machine 1100 transitions to state 1116 where an error message is generated. If the selected trigger administrator is unprotected, the state machine 1100 transitions to state 1118. At state 1118, the current resource roles of the selected trigger are analyzed to determine if the roles may be properly handed off to other contexts. If the resource roles cannot be correctly handed off, the trigger is unavailable and the state machine 1100 moves to state 1116 where an error is generated. If the resource roles can be correctly handed off, the state machine 1100 moves to state 1120, where the selected trigger is assigned to the current state. An illustrative state machine for performing this process is described below with respect to FIG. 13.

Figure 12:
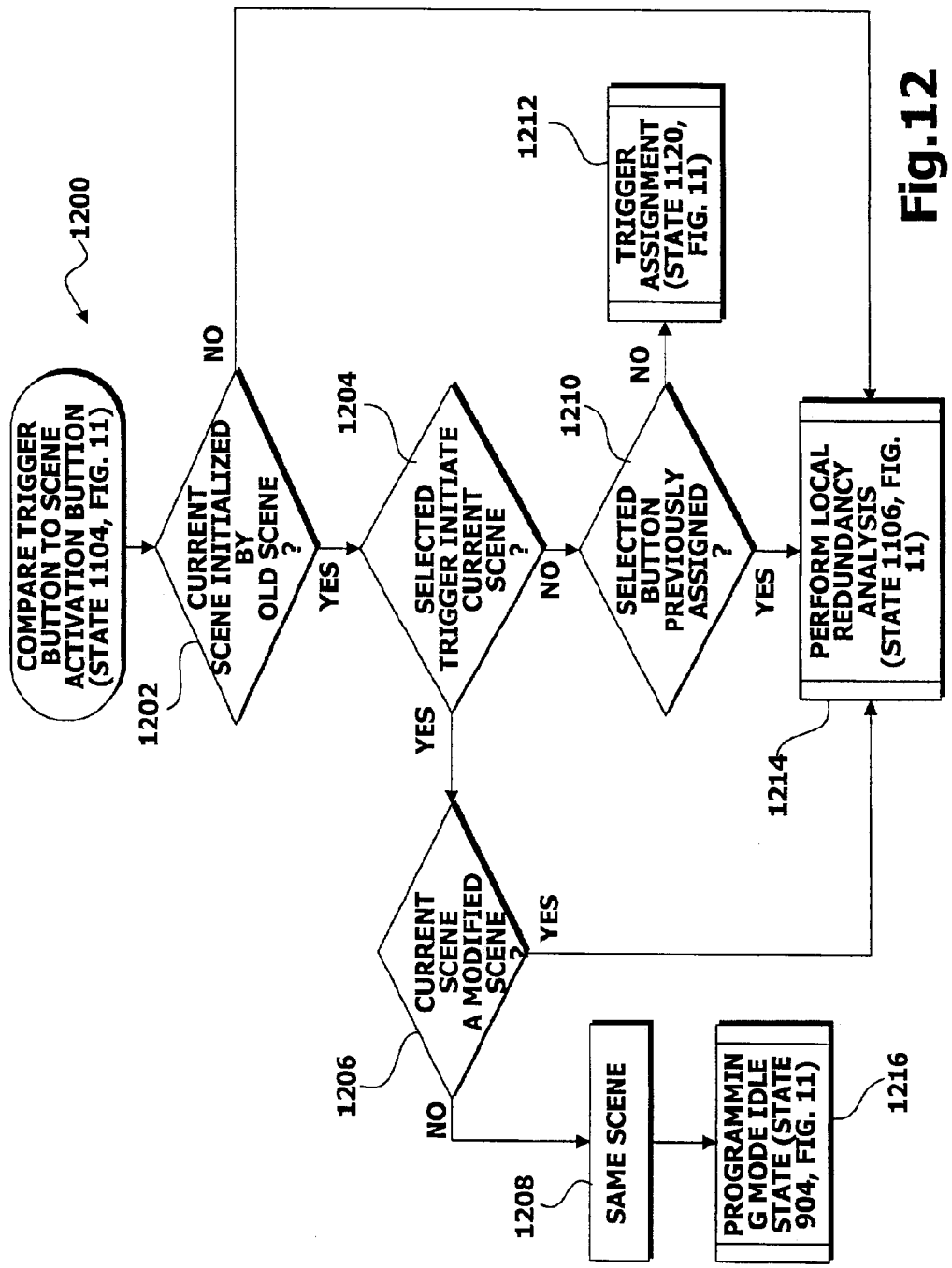
FIG. 12 is a flow diagram showing an illustrative routine for comparing a selected trigger button to a button utilized to activate a current scene.

Turning now to FIG. 12, an illustrative Routine 1200 for comparing the trigger button to the button utilized to activate the current scene will be described. The Routine 1200 begins at block 1202, where a determination is made as to whether the current scene was initialized by the activation of a previously programmed scene. If the current scene was not initialized by the activation of a previously programmed scene, the Routine 1200 branches to block 1214. Block 1204 returns the Routine 1200 to state 1106, shown in FIG. 11, where a local redundancy analysis is performed. If the current scene was initialized by the activation of a previously programmed scene, the Routine 1200 continues to block 1204.

At block 1204, a determination is made as to whether the selected trigger is the same button that initiated the member set of the current scene. If the selected button is the same, the Routine 1200 branches to block 1206. At block 1206, a determination is made as to whether the current scene is a modified version of another scene. If the current scene is not a modified scene, the Routine 1200 branches to block 1208, then the same trigger has been selected in a scene copy, no change is made in the trigger, and the programming current scene is ended. The Routine 1200 then continues to block 1216, where the programming mode idle state 904, shown in FIG. 11, is entered. If the current scene is a modified scene, the Routine 1200 branches to block 1214. As described above, block 1214 returns the Routine 1200 to state 1106, shown in FIG. 11, where a local redundancy analysis is performed.

If, at block 1204, it is determined that the selected button is not the same, the Routine 1200 continues to block 1210. At block 1210, a determination is made as to whether the selected button was previously assigned to another house scene. If the selected button was not previously assigned to another house scene, the Routine 1200 branches to block 1212. Block 1212 returns the Routine 1200 to state 1120, shown in FIG. 11, for trigger assignment. If the selected button was previously assigned to another house scene, the Routine 1200 continues to block 1214, where a local redundancy analysis is performed.

Figure 13:
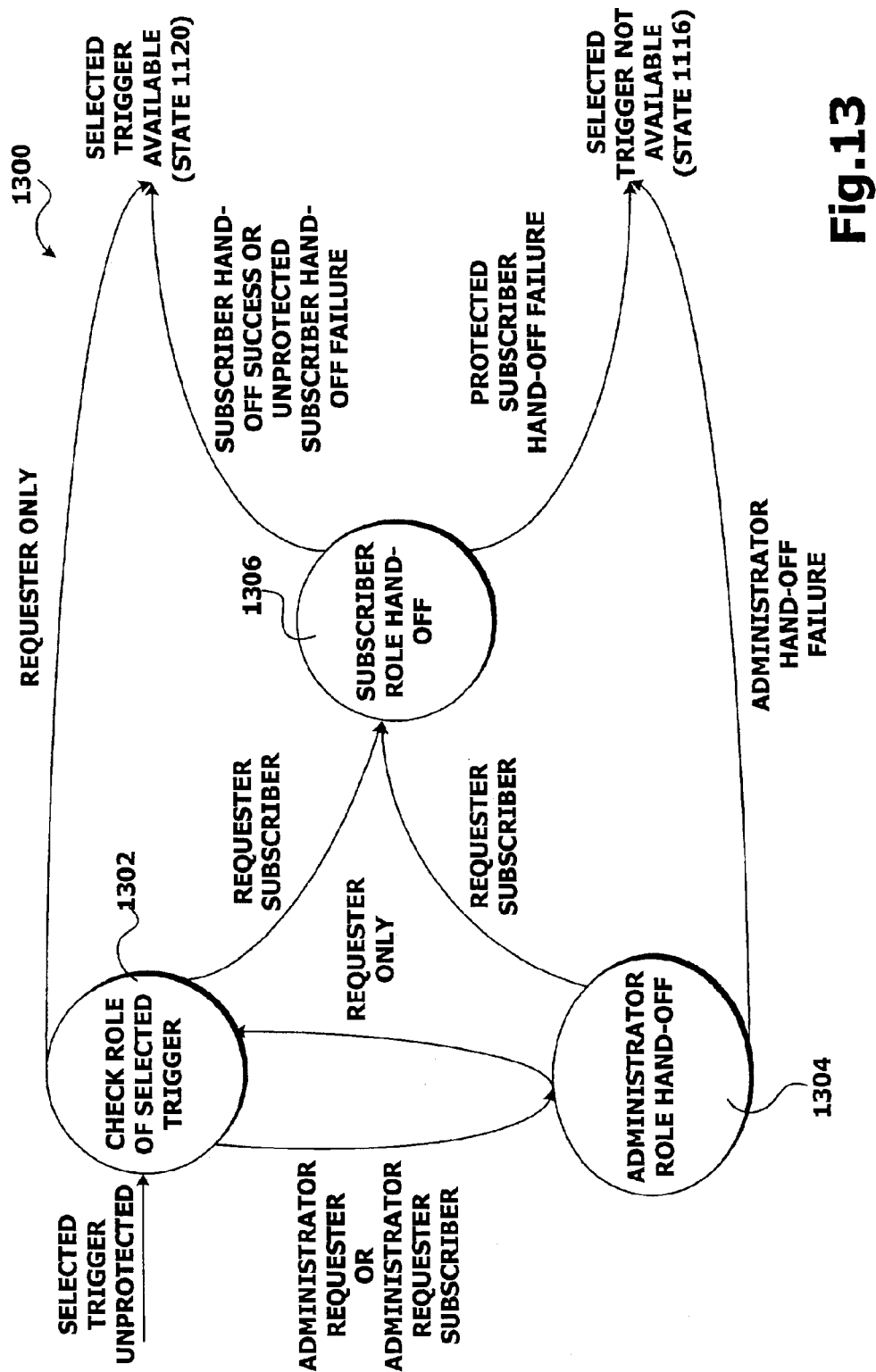
FIG. 13 is a state diagram showing an illustrative state machine for analyzing the current resource roles for an unprotected selected trigger to determine if the roles may be properly handed off to other contexts.

Referring now to FIG. 13, an illustrative state machine 1300 will be described for analyzing the current resource roles for an unprotected selected trigger to determine if the roles may be properly handed off to other contexts. Prior to discussing the state machine 1300, it should be appreciated that a trigger button may be coupled to resources within the device that perform several different types of roles within a home automation system. For instance, a publisher, or provider, role provides a means for a device to affect other devices, while a subscriber role provides a means for a device to be affected by other devices. A publisher/requester role can both affect and be affected by other resources. A particular type of publisher role defined by the SRDM 84 is the administrator role. The administrator role places responsibility with a context for providing access to the resource current value, providing support for indirect coupling of publishers to a resource's subscribers, providing power-up status reports of the resource's current value, and providing a periodic update of the resource's current value. If the selected trigger button is bound to a context serving in either the administrator role or the subscriber role, these roles must be reassigned to other resources before the current scene can be correctly bound to the selected trigger. The SRDM 84 administrator roles and dynamic role changing method provide the ability to reassign the roles.

The state machine 1300 begins at state 1302 where the resource role coupled to the selected trigger is determined. If the resource role is a requester role only, no roles must be reassigned, so the state machine 1300 transitions to state 1120, shown in FIG. 11. If the resource role comprises a subscriber role, the state machine 1300 moves to state 1306, where the subscriber role is handed off to another resources. In particular, the subscriber role is handed off to a local house scene context from a pool of subscriber contexts available for registering the local load as a participating member of a house scene. If the hand-off is successful, the state machine 1300 moves to state 1120. If the hand-off is unsuccessful, the state machine 1300 moves to state 1116, also shown in FIG. 11.

If, at state 1302, it is determined that the resource role coupled to the selected trigger includes an administrator role, the state machine 1300 moves to state 1304. At state 1304, the administrator role is handed off to a context located on another device within the home automation system that was discovered during the network wide redundancy analysis described above. If the hand-off is unsuccessful, the state machine 1300 moves to state 1116. If the hand-off is successful and the resource roles coupled to the selected trigger do not also include a subscriber role, the state machine 1300 moves back to state 1302. If the hand-off is successful and the resource roles coupled to the selected trigger include a subscriber role, then the state machine 1300 moves to state 1306 where the subscriber role is handed off as described above.

Figure 14:
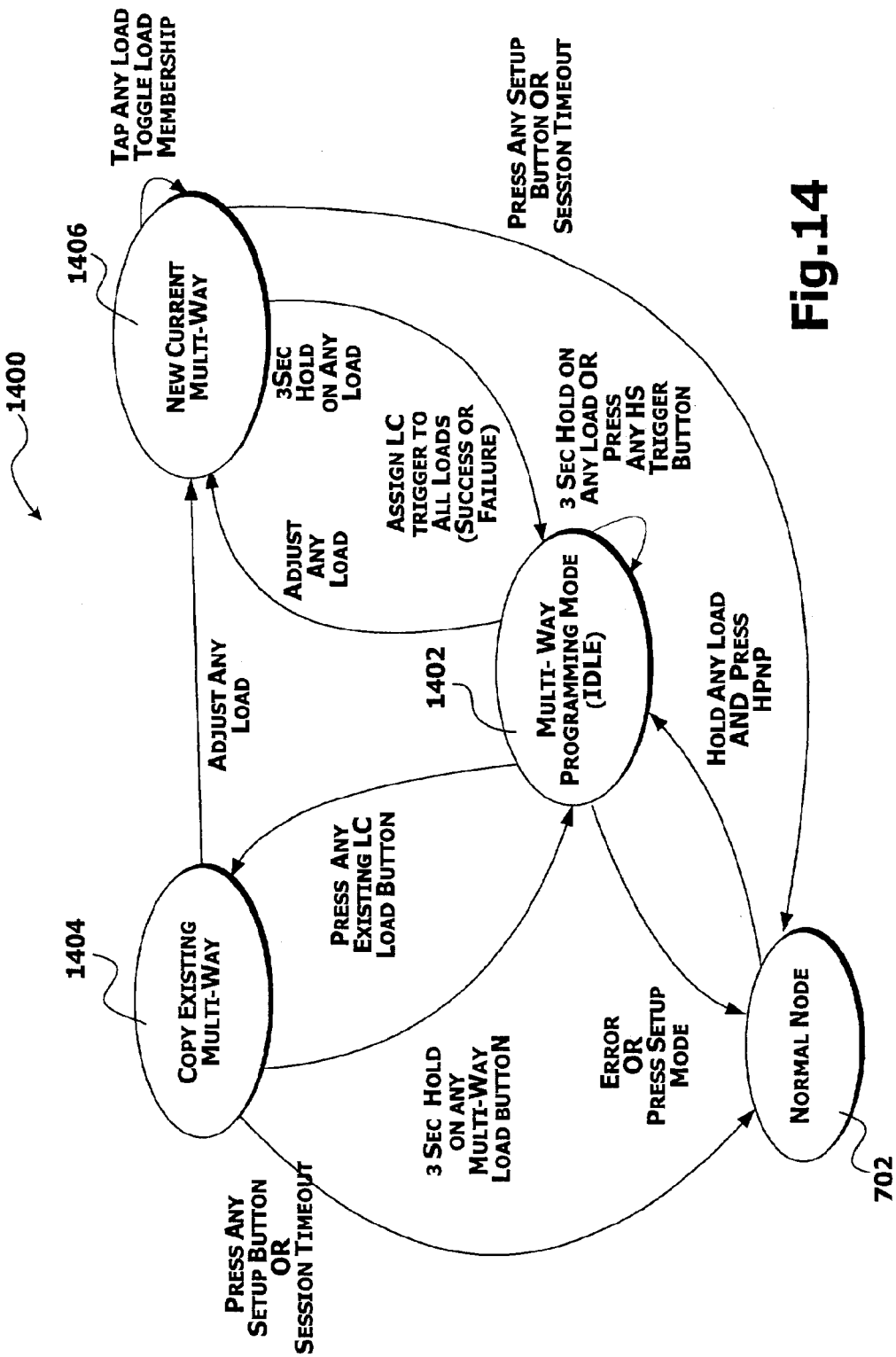
FIG. 14 is a state diagram showing an illustrative state machine for programming a multi-way, multi-load lighting context according to an actual embodiment of the present invention.

Referring now to FIG. 14, an illustrative state machine 1400 will be described for programming a multi-way multi-load lighting context. A multi-way multi-load lighting context allows any number of devices to directly control a single or multiple loads. For instance, a load control button one device may be programmed to directly control the loads of other devices as if the devices themselves were directly controlling the toad. The state machine 1400 illustrates an illustrative programming interface for programming devices supporting a multi-way multi-load lighting context according to an actual embodiment of the present invention.

During manual programming of a multi-way multi-load lighting context using the front panel buttons of a device to set up and assign group membership, a design concept known as the "current multi-way" has an influence on this process. The current multi-way is a temporary set of elected and incumbent multi-way member loads. Load membership election is attained through toggling the load button provided on the devices for direct, manual user control of the attached load. Devices that receive a special CAL command to activate a previously captured multi-way group, and are members of the activated multi-way, attain incumbent membership in the current multi-way.

The state machine 1400 for programming a multi-way lighting context is similar to the state machine 900 for house scene programming described above with reference to FIG. 9. However, some of the implementation details are different. One difference is that a lighting context channel number is hailed for instead of a house scene context channel number. The hailing for the lighting context channel number is implemented as described in the Home Plug and Play Specification. Another difference is that trigger selection is performed by holding a multi-way load button for three seconds instead of pressing a trigger button. Selection of a trigger also results in all load buttons in the multi-way being triggers for the multi-way. In multi-way lighting context programming, load adjustments are binary toggle. The load buttons do not control the load while in a multi-way programming session. The first adjustment includes the load as a member. The next adjustment excludes the load. The multi-way also differs from house scene programming in that the load control is disabled during multi-way programming, and the load value does not change when the load control button is used to toggle the membership in the multi-way group.

The state diagram 1400 for providing a multi-way multi-load lighting context will be described. The state machine 1400 begins operation in state 702, the normal mode. The state machine 1400 moves to the multi-way programming mode idle state 1402 in response to the user holding the load button while pushing a single press on the setup button (located behind the cover plate of a switch). The device that is used for establishing programming mode is a PMI. Upon entering the multi-way programming idle state 1402, each device shows an indicator on their LED indicating that the device is in multi-way programming mode. The PMI needs an available network channel instance for the lighting context being programmed. The PMI obtains this channel number through the background resource channel hailing process described above.

If the load button is toggled on any device, the state machine 1400 moves from state 1402 to the new current multi-way state 1406. In this state additional members may be added to the current multi-way by toggling their load switch. Members may be removed from the current multi-way by pressing the load switch a second time. When all members have had been selected, all of the load buttons may be captured as multi-way triggers by holding any one of the multi-way load buttons for 3 seconds. Holding a non-member load button for a preset period of time (three seconds in the actual embodiment described herein) makes that load a member and captures the multi-way at the same time. This returns the state machine 1400 to the multi-way programming idle mode 1402. Another multi-way can now be programmed.

In order to modify an existing multi-way, one of that load buttons participating in the multi-way must be pressed as the first thing in a multi-way programming session. This will cause the state machine to transition from the multi-way programming idle mode state 1402 to the copy existing multi-way state 1404. The copied subscribers will remain as members of the new current multi-way unless removed. After the multi-way is copied, and membership is modified by toggling loads, the multi-way capture (3 second hold) completes the change. This causes the state machine 1400 to transition from the copy existing multi-way state 1404 back to the multi-way programming mode idle state 1402. The old multi-way still exists only for those members that were toggled out of the new multi-way. Pressing the setup button from the multi-way programming mode idle state 1402, the copy existing multi-way state 1404, or the new current multi-way state 1406 will cause the state machine 1400 to end the session and transition back to the normal mode 702.

Figure 15:
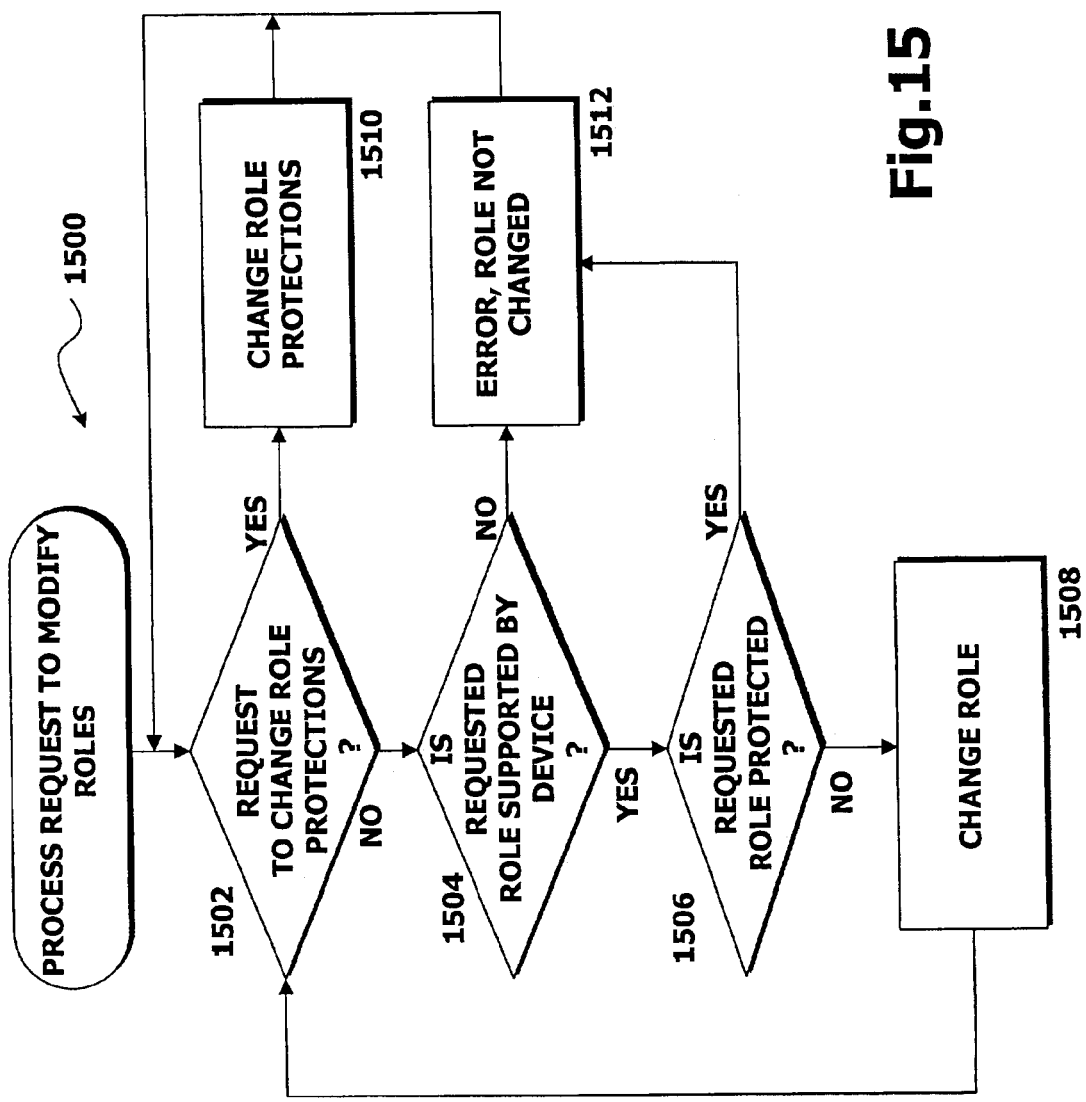
FIG. 15 is a flow diagram illustrating a routine for processing requests to modify roles according to an actual embodiment of the present invention.

Referring now to FIG. 15, an illustrative Routine 1500 for changing the roles performed by the Home Plug & Play protocol 82 contexts will be described. The roles performed by a particular context instance may change during programming, such as when the administrator role is handed off from a trigger being overwritten by a new scene. Routine 1500 begins at block 1502, where a determination is made as to whether the request is to change role protection setting.

If the change is to the role protection setting, then Routine 1500 branches to block 1510 and changes the role protection setting as requested. If the requested role change is not to the role protection setting, the Routine 1500 continues to block 1504. At block 1504 the requested roles are compared to the list of roles that the context instance supports. Not all instances of one context necessarily support the same roles. If the context instance does not support all of the requested roles, the Routine 1500 branches to block 1512 where an error is returned. If the context instance does support all the requested roles, the Routine 1500 continues to block 1506 where a check of the role protection settings is made. If the request involves changing a role that is protected, then the routine branches to block 1512 where no change to the role is made and an error is returned. If the roles that will be changed by the request are not protected, the Routine 1500 continues to block 1508 where the role changed is completed. From blocks 1508, 1510, and 1512, the Routine 1500 returns to block 1502, where additional requests are processed.

Referring now to FIG. 16, an illustrative Routine 1600 for processing resource requests to a context instance based on the SRDM 84 roles set will be described. As described briefly above, the SRDM 84 provides the ability to dynamically assign roles to context instances. Routine 1600 begins at block 1602 where a check on the requester role setting is made. If the requester role is not set for the context instance, the Routine 1600 branches to block 1604. If the requester role is set, the Routine 1600 will branch to block 1610 where the applicable requester role service is processed. The Routine 1600 then continues to block 1604.

At block 1604 a check on the subscriber role setting is made. If the subscriber role is not set for the context instance, the Routine 1600 continues to block 1606. If the subscriber role is set, the Routine 1600 branches to block 1612 to process the applicable subscriber role service before proceeding to block 1606. At block 1606 a check on the administrator role setting is made. If the administrator role is not set for the context instance, the role based processing is finished and Routine 1600 branches to block 1608. If the administrator role is set, the Routine 1600 will branch to the 1614 block to process the applicable administrator role service before proceeding to block 1608. At block 1608, the Routine 1600 waits for the next resource request and proceeds back to block 1602 when one is received.

Turning now to FIG. 17, an illustrative flow diagram 1700 will be described for processing of a SRDM macro with input variables indicating a new scene binding request. Routine 1700 begins at block 1702 where the existence of the requested instance is confirmed. If the instance exists, the Routine. 1700 proceeds to block 1704. If the instance does not exist, the Routine 1700 branches to 1710 where an error message is transmitted. At block 1704, the roles requested by the macro are compared to the roles supported by the requested context instance. If the context instance can support the requested roles, the Routine 1700 proceeds to block 1706. If the instance cannot support the requested roles, the Routine 1700 branches to 1710 where an error message is transmitted.

At block 1706, the Routine 1700 compares the macro context requested with the actual context of the instance. If the contexts match, the Routine 1700 proceeds to block 1708 and the requested context instance is bound to the macro input channel number with the requested roles set. If the contexts do not match, the Routine 1700 branches to 1710 where an error is returned. The processing for a SRDM macro with input variables set to unbinding is similar, except that multiple instances can be unbound with one macro by using a wildcard instance indicator in the macro input, and the instance or instances are unbound instead of bound at block 1708. All contexts can be unbound by the use of a wildcard context indicator in the macro input.

In light of the above, it should be appreciated that the present invention provides a method, system, and apparatus for providing distributed control of a home automation system. While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. A method for providing distributed control of a home automation system including a plurality of load control devices, each of said load control devices controlling a load comprising:
   in response to receiving a request at one of said plurality of load control devices to configure said plurality of load control devices as a scene transmitting a scene state change message from said one of said plurality of load control devices to each of said plurality of load control devices;
   in response to receiving said scene state change message, each of said plurality of load control devices determining if said load control device is a subscriber to said scene; and
   if said load control device is a subscriber to said scene, adjusting the state of said load control device according to a scene definition corresponding to said scene stored in said load control device.

2. The method of claim 1, wherein said request to configure said plurality of load control devices as a scene comprises the selection of a trigger button located on said one of said load control devices.

3. The method of claim 2, wherein said scene state change message comprises a house scene channel number.

4. The method of claim 3, wherein determining whether said load control device is a subscriber to said scene comprises determining whether said house scene channel number is bound to a scene definition stored in said load control device.

5. The method of claim 4, wherein adjusting a state of each of said load control devices that is a subscriber to said scene comprises adjusting the load controlled by said load control device.

6. The method of claim 5, wherein adjusting the load controlled by said load control device comprises turning said load on, turning said load off, or setting said load to an intermediate value.

7. The method of claim 6, further comprising:
   determining whether said scene is currently active; and
   if said scene is currently active, transmitting a scene deactivate message in response to receiving at said one of said plurality of load control devices said request to configure said plurality of load control devices as a scene.

8. The method of claim 7, further comprising:
   in response to receiving said scene deactivate message, determining at each of said load control devices whether said load control device is a subscriber to said scene; and
   if said load control device is a subscriber to said scene, deactivating said scene at said load control device.

9. A computer-readable medium comprising instructions which, when executed by a microprocessor controlled device, cause the device to perform the method of any one of claims 1–8.

10. A microprocessor controlled device operative to perform the method of any one of claims 1–8.

11. A method for programming the scenes of a distributed control home automation system including a plurality of load control devices, each of said load control devices controlling a load comprising:

in response to receiving an indication at one of said load control devices that said plurality of load control devices should be placed in a scene programming mode, transmitting a message from said one of said load control devices to each of said plurality of load control devices indicating that each of said load control devices should be placed in said scene programming mode; and in response to receiving an indication that one or more of said load control devices should be included as a participant in a current scene, storing at each of said one or more load control devices an indication that said load control device should be included as a participant in a current scene, said indication including a scene definition describing a state of said load control device corresponding to said current scene.

12. The method of claim 11, further comprising: in response to receiving at one or more of said load control devices the selection of an indicator for launching said current scene, assigning said indicator as a trigger for launching said current scene.

13. The method of claim 12, wherein assigning said indicator comprises:

binding a house scene channel number to said indicator; and binding said house scene channel number to said scene definition stored at each of said one or more load control devices participating in said current scene.

14. The method of claim 13, further comprising:

in response to receiving the selection of an indicator for launching a previously created scene, adding the load control devices participating in said previously created scene to said current scene.

15. The method of claim 14, wherein said house scene channel number is identified by said one of said load control devices in the background.

16. The method of claim 15, wherein receiving the selection of an indicator for launching said current scene comprises receiving the selection of a trigger button on one of said plurality of load control devices.

17. The method of claim 16, wherein said indication at one of said load control devices that said plurality of load control devices should be placed in a scene programming mode comprises the selection of a setup button included on said one of said plurality of load control devices.

18. The method of claim 17, wherein said indication that one or more of said load control devices should be included as a participant in a current scene comprises the selection of a load control button on said load control devices to be included as participants in said current scene.

19. A computer-readable medium comprising instructions which, when executed by a microprocessor controlled device, cause the device to perform the method of any one of claims 11–18.

20. A microprocessor controlled device operative to perform the method of any one of claims 11–18.

21. A method for multi-way programming of a distributed control all home automation system including a plurality of load control devices, each of said load control devices controlling a load, comprising:

in response to receiving an indication at one of said load control devices that said plurality of load control devices should be placed in a multi-way programming mode, transmitting a message from said one of said load control devices to each of said plurality of load control devices indicating that each of said load control devices should be placed in said multi-way programming mode;

in response to receiving an indication that one or more of said load control devices should be included as a participant in a current multi-way, adding each of said one or more load control devices to said current multi-way; and in response to receiving an indication that each of said load control devices in said current multi-way should be controlled by an indicator, binding each of said load control devices in said current multi-way to said indicator.

22. The method of claim 21, further comprising:

in response to receiving the selection of an indicator for controlling a previously created multi-way, adding the participants in said previously created multi-way to said current multi-way.

23. The method of claim 22, further comprising:

locating at said one of said load control devices a network channel number for binding said load control devices to said current multi-way.

24. The method of claim 23, wherein receiving an indication that one or more of said load control devices should be included as a participant in a current multi-way comprises receiving the selection of a load control button located on said one or more load control devices.

25. The method of claim 24, wherein receiving an indication that each of said load control devices in said current multi-way should be controlled by an indicator comprises receiving the selection of one of said load control buttons for a preset period of time.

26. The method of claim 25, wherein receiving an indication at one of said load control devices that said plurality of load control devices should be placed in a multi-way programming mode comprises the selection of a setup button.

27. A computer-readable medium comprising instructions which, when executed by a microprocessor controlled device, cause the device to perform the method of any one of claims 21–26.

28. A microprocessor controlled device operative to perform the method of any one of claims 21–26.

* * * * *